US010567633B2

(12) United States Patent
Ihlenburg et al.

(10) Patent No.: US 10,567,633 B2
(45) Date of Patent: *Feb. 18, 2020

(54) VEHICLE VISION SYSTEM USING IMAGE DATA TRANSMISSION AND POWER SUPPLY VIA A COAXIAL CABLE

(71) Applicant: MAGNA ELECTRONICS INC., Auburn Hills, MI (US)

(72) Inventors: Joern Ihlenburg, Berlin (DE); Jens Steigerwald, Sailauf-Eichenberg (DE); Michael Dominik Schöppner, Künzell (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/401,163

(22) Filed: May 2, 2019

(65) Prior Publication Data
US 2019/0260922 A1 Aug. 22, 2019

Related U.S. Application Data

(63) Continuation of application No. 15/899,111, filed on Feb. 19, 2018, now Pat. No. 10,284,764, which is a (Continued)

(51) Int. Cl.
*H04N 5/232* (2006.01)
*H04N 7/18* (2006.01)
(Continued)

(52) U.S. Cl.
CPC ......... *H04N 5/23203* (2013.01); *B60R 16/02* (2013.01); *G08G 1/165* (2013.01);
(Continued)

(58) Field of Classification Search
CPC .......... H04N 5/23203; H04N 5/23241; H04N 5/23293; H04N 7/10; H04N 7/181;
(Continued)

(56) References Cited

U.S. PATENT DOCUMENTS 4,987,357 A   1/1991  Masaki
4,991,054 A   2/1991  Walters
            (Continued)

FOREIGN PATENT DOCUMENTS

CN    101082489 A   12/2007
DE     10036875 A1   2/2002
            (Continued)

OTHER PUBLICATIONS

International Search Report and Written Opinion dated Feb. 7, 2013 from corresponding PCT Application No. PCT/US2012/056014.
(Continued)

*Primary Examiner* — Michael E Teitelbaum
(74) *Attorney, Agent, or Firm* — Honigman LLP

(57) ABSTRACT

A vehicular vision system includes a plurality of imaging sensors disposed at a vehicle and having respective exterior fields of view, each of the imaging sensors capturing respective image data. The imaging sensors are connected to a control via respective ones of a plurality of single core coaxial cables. Each single core coaxial cable commonly carries (i) image data from the respective imaging sensor to the control for processing and (ii) power to the respective imaging sensor. Each imaging sensor is capable of communicating via a particular communication protocol. While each of the imaging sensors is in a respective initial mode and after the communication protocol is transmitted by the control to each of the imaging sensors, each of the imaging sensors communicates with the control in accordance with the communication protocol. Each of the single core coaxial
(Continued)

cables provides bidirectional communication between the control and the respective imaging sensor.

24 Claims, 22 Drawing Sheets

Related U.S. Application Data continuation of application No. 15/438,825, filed on Feb. 22, 2017, now Pat. No. 9,900,490, which is a continuation of application No. 14/343,936, filed as application No. PCT/US2012/056014 on Sep. 19, 2012, now abandoned.

(60) Provisional application No. 61/653,664, filed on May 31, 2012, provisional application No. 61/567,150, filed on Dec. 6, 2011, provisional application No. 61/567,446, filed on Dec. 6, 2011, provisional application No. 61/537,279, filed on Sep. 21, 2011.

(51) Int. Cl.

| | | |
|---|---|---|
| *G08G 1/16* | (2006.01) | |
| *B60R 16/02* | (2006.01) | |
| *H01B 1/02* | (2006.01) | |
| *H01B 3/44* | (2006.01) | |
| *H01B 7/02* | (2006.01) | |
| *H01B 11/18* | (2006.01) | |
| *H04N 7/10* | (2006.01) | |

(52) U.S. Cl.
CPC .............. *H01B 1/02* (2013.01); *H01B 3/445* (2013.01); *H01B 7/0216* (2013.01); *H01B 11/18* (2013.01); *H04N 5/23241* (2013.01); *H04N 5/23293* (2013.01); *H04N 7/10* (2013.01); *H04N 7/181* (2013.01); *H04N 7/183* (2013.01)

(58) Field of Classification Search
CPC .......... B60R 16/02; H01B 1/02; H01B 3/445; H01B 7/0216; H01B 11/18
See application file for complete search history.

(56) References Cited

U.S. PATENT DOCUMENTS

| | | |
|---|---|---|
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,044,706 A | 9/1991 | Chen |
| 5,055,668 A | 10/1991 | French |
| 5,059,877 A | 10/1991 | Teder |
| 5,064,274 A | 11/1991 | Alten |
| 5,072,154 A | 12/1991 | Chen |
| 5,086,253 A | 2/1992 | Lawler |
| 5,096,287 A | 3/1992 | Kakinami et al. |
| 5,097,362 A | 3/1992 | Lynas |
| 5,121,200 A | 6/1992 | Choi |
| 5,124,549 A | 6/1992 | Michaels et al. |
| 5,130,709 A | 7/1992 | Toyama et al. |
| 5,168,378 A | 12/1992 | Black |
| 5,170,374 A | 12/1992 | Shimohigashi et al. |
| 5,172,235 A | 12/1992 | Wilm et al. |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,204,778 A | 4/1993 | Bechtel |
| 5,208,701 A | 5/1993 | Maeda |
| 5,245,422 A | 9/1993 | Borcherts et al. |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Klegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,498,866 A | 3/1996 | Bendicks et al. |
| 5,500,766 A | 3/1996 | Stonecypher |
| 5,510,983 A | 4/1996 | Lino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,555 A | 9/1996 | Sato et al. |
| 5,568,027 A | 10/1996 | Teder |
| 5,574,443 A | 11/1996 | Hsieh |
| 5,581,464 A | 12/1996 | Woll et al. |
| 5,594,222 A | 1/1997 | Caldwell |
| 5,614,788 A | 3/1997 | Mullins |
| 5,619,370 A | 4/1997 | Guinosso |
| 5,632,092 A | 5/1997 | Blank et al. |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,670,935 A | 9/1997 | Schofield et al. |
| 5,677,851 A | 10/1997 | Kingdon et al. |
| 5,699,044 A | 12/1997 | Van Lente et al. |
| 5,724,316 A | 3/1998 | Brunts |
| 5,732,379 A | 3/1998 | Eckert et al. |
| 5,737,226 A | 4/1998 | Olson et al. |
| 5,760,828 A | 6/1998 | Cortes |
| 5,760,931 A | 6/1998 | Saburi et al. |
| 5,761,094 A | 6/1998 | Olson et al. |

(56) References Cited

U.S. PATENT DOCUMENTS

| | | |
|---|---|---|
| 5,765,116 A | 6/1998 | Wilson-Jones et al. |
| 5,765,118 A | 6/1998 | Fukatani |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,835,255 A | 11/1998 | Miles |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,357 A | 3/1999 | Sivashankar et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,915,800 A | 6/1999 | Hiwatashi et al. |
| 5,923,027 A | 7/1999 | Stam et al. |
| 5,924,212 A | 7/1999 | Domanski |
| 5,949,331 A | 9/1999 | Schofield et al. |
| 5,959,555 A | 9/1999 | Furuta |
| 5,963,247 A | 10/1999 | Banitt |
| 5,986,796 A | 11/1999 | Miles |
| 5,990,469 A | 11/1999 | Bechtel et al. |
| 5,990,649 A | 11/1999 | Nagao et al. |
| 6,020,704 A | 2/2000 | Buschur |
| 6,049,171 A | 4/2000 | Stam et al. |
| 6,066,933 A | 5/2000 | Ponziana |
| 6,084,519 A | 7/2000 | Coulling et al. |
| 6,097,024 A | 8/2000 | Stam et al. |
| 6,100,799 A | 8/2000 | Fenk |
| 6,115,159 A | 9/2000 | Baker |
| 6,144,022 A | 11/2000 | Tenenbaum et al. |
| 6,175,300 B1 | 1/2001 | Kendrick |
| 6,178,034 B1 | 1/2001 | Allemand et al. |
| 6,201,642 B1 | 3/2001 | Bos |
| 6,223,114 B1 | 4/2001 | Boros et al. |
| 6,227,689 B1 | 5/2001 | Miller |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,294,989 B1 | 9/2001 | Schofield et al. |
| 6,297,781 B1 | 10/2001 | Turnbull et al. |
| 6,310,611 B1 | 10/2001 | Caldwell |
| 6,317,057 B1 | 11/2001 | Lee |
| 6,320,282 B1 | 11/2001 | Caldwell |
| 6,333,759 B1 | 12/2001 | Mazzilli |
| 6,353,392 B1 | 3/2002 | Schofield et al. |
| 6,370,329 B1 | 4/2002 | Teuchert |
| 6,392,315 B1 | 5/2002 | Jones et al. |
| 6,396,397 B1 | 5/2002 | Bos et al. |
| 6,411,204 B1 | 6/2002 | Bloomfield et al. |
| 6,424,273 B1 | 7/2002 | Gutta et al. |
| 6,430,303 B1 | 8/2002 | Naoi et al. |
| 6,442,465 B2 | 8/2002 | Breed et al. |
| 6,477,464 B2 | 11/2002 | McCarthy et al. |
| 6,497,503 B1 | 12/2002 | Dassanayake et al. |
| 6,498,620 B2 | 12/2002 | Schofield et al. |
| 6,534,884 B2 | 3/2003 | Marcus et al. |
| 6,539,306 B2 | 3/2003 | Turnbull |
| 6,547,133 B1 | 4/2003 | Devries, Jr. et al. |
| 6,553,130 B1 | 4/2003 | Lemelson et al. |
| 6,574,033 B1 | 6/2003 | Chui et al. |
| 6,589,625 B1 | 7/2003 | Kothari et al. |
| 6,594,583 B2 | 7/2003 | Ogura et al. |
| 6,611,610 B1 | 8/2003 | Stam et al. |
| 6,636,258 B2 | 10/2003 | Strumolo |
| 6,650,455 B2 | 11/2003 | Miles |
| 6,672,731 B2 | 1/2004 | Schnell et al. |
| 6,674,562 B1 | 1/2004 | Miles |
| 6,680,792 B2 | 1/2004 | Miles |
| 6,690,268 B2 | 2/2004 | Schofield et al. |
| 6,700,605 B1 | 3/2004 | Toyoda et al. |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,717,610 B1 | 4/2004 | Bos et al. |
| 6,735,506 B2 | 5/2004 | Breed et al. |
| 6,741,377 B2 | 5/2004 | Miles |
| 6,744,353 B2 | 6/2004 | Sjonell |
| 6,762,867 B2 | 7/2004 | Lippert et al. |
| 6,794,119 B2 | 9/2004 | Miles |
| 6,795,221 B1 | 9/2004 | Urey |
| 6,806,452 B2 | 10/2004 | Bos et al. |
| 6,819,231 B2 | 11/2004 | Berberich et al. |
| 6,823,241 B2 | 11/2004 | Shirato et al. |
| 6,824,281 B2 | 11/2004 | Schofield et al. |
| 6,850,156 B2 | 2/2005 | Bloomfield et al. |
| 6,889,161 B2 | 5/2005 | Winner et al. |
| 6,909,753 B2 | 6/2005 | Meehan et al. |
| 6,946,978 B2 | 9/2005 | Schofield |
| 6,975,775 B2 | 12/2005 | Rykowski et al. |
| 6,989,736 B2 | 1/2006 | Berberich et al. |
| 7,004,606 B2 | 2/2006 | Schofield |
| 7,038,577 B2 | 5/2006 | Pawlicki et al. |
| 7,062,300 B1 | 6/2006 | Kim |
| 7,065,432 B2 | 6/2006 | Moisel et al. |
| 7,079,017 B2 | 7/2006 | Lang et al. |
| 7,085,637 B2 | 8/2006 | Breed et al. |
| 7,092,548 B2 | 8/2006 | Laumeyer et al. |
| 7,111,968 B2 | 9/2006 | Bauer et al. |
| 7,116,246 B2 | 10/2006 | Winter et al. |
| 7,123,168 B2 | 10/2006 | Schofield |
| 7,136,753 B2 | 11/2006 | Samukawa et al. |
| 7,145,519 B2 | 12/2006 | Takahashi et al. |
| 7,149,613 B2 | 12/2006 | Stam et al. |
| 7,161,616 B1 | 1/2007 | Okamoto et al. |
| 7,195,381 B2 | 3/2007 | Lynam et al. |
| 7,202,776 B2 | 4/2007 | Breed |
| 7,227,611 B2 | 6/2007 | Hull et al. |
| 7,365,769 B1 | 4/2008 | Mager |
| 7,381,089 B2 | 6/2008 | Hosier, Sr. |
| 7,460,951 B2 | 12/2008 | Altan |
| 7,490,007 B2 | 2/2009 | Taylor et al. |
| 7,526,103 B2 | 4/2009 | Schofield et al. |
| 7,592,928 B2 | 9/2009 | Chinomi et al. |
| 7,639,149 B2 | 12/2009 | Katoh |
| 7,681,960 B2 | 3/2010 | Wanke et al. |
| 7,720,580 B2 | 5/2010 | Higgins-Luthman |
| 7,724,962 B2 | 5/2010 | Zhu et al. |
| 7,843,235 B2 | 11/2010 | Yanbo et al. |
| 7,855,755 B2 | 12/2010 | Weller et al. |
| 7,881,496 B2 | 2/2011 | Camilleri et al. |
| 7,952,490 B2 | 5/2011 | Fechner et al. |
| 7,965,336 B2 | 6/2011 | Bingle et al. |
| 8,013,780 B2 | 9/2011 | Lynam |
| 8,027,029 B2 | 9/2011 | Lu et al. |
| 8,849,495 B2 | 9/2014 | Chundrik, Jr. et al. |
| 8,908,039 B2 | 12/2014 | De Wind et al. |
| 9,126,525 B2 | 9/2015 | Lynam et al. |
| 9,210,307 B2 | 12/2015 | Gebauer et al. |
| 9,900,490 B2 | 2/2018 | Ihlenburg et al. |
| 10,284,764 B2 | 5/2019 | Ihlenburg et al. |
| 2002/0015153 A1 | 2/2002 | Downs |
| 2002/0113873 A1 | 8/2002 | Williams |
| 2002/0149679 A1 | 10/2002 | Deangelis et al. |
| 2002/0167589 A1 | 11/2002 | Schofield et al. |
| 2003/0081120 A1 | 5/2003 | Klindworth |
| 2003/0103141 A1 | 6/2003 | Bechtel et al. |
| 2003/0137586 A1 | 7/2003 | Lewellen |
| 2003/0222982 A1 | 12/2003 | Hamdan et al. |
| 2004/0114381 A1 | 6/2004 | Salmeen et al. |

(56) References Cited

U.S. PATENT DOCUMENTS

| | | |
|---|---|---|
| 2005/0200467 A1 | 9/2005 | Au et al. |
| 2006/0017807 A1 | 1/2006 | Lee et al. |
| 2006/0018511 A1 | 1/2006 | Stam et al. |
| 2006/0018512 A1 | 1/2006 | Stam et al. |
| 2006/0023105 A1 | 2/2006 | Kostrzewski et al. |
| 2006/0091813 A1 | 5/2006 | Stam et al. |
| 2006/0103727 A1 | 5/2006 | Tseng |
| 2006/0164221 A1 | 7/2006 | Jensen |
| 2006/0184297 A1 | 8/2006 | Higgins-Luthman |
| 2006/0206243 A1 | 9/2006 | Pawlicki et al. |
| 2006/0212624 A1 | 9/2006 | Kim |
| 2006/0250501 A1 | 11/2006 | Widmann et al. |
| 2006/0254805 A1 | 11/2006 | Scherer et al. |
| 2006/0290479 A1 | 12/2006 | Akatsuka et al. |
| 2007/0104476 A1 | 5/2007 | Yasutomi et al. |
| 2007/0206835 A1 | 9/2007 | Abe |
| 2007/0297784 A1 | 12/2007 | Wong et al. |
| 2008/0042812 A1 | 2/2008 | Dunsmoir et al. |
| 2009/0093938 A1 | 4/2009 | Isaji et al. |
| 2009/0113509 A1 | 4/2009 | Tseng et al. |
| 2009/0174765 A1 | 7/2009 | Namba et al. |
| 2009/0177347 A1 | 7/2009 | Breuer et al. |
| 2009/0243824 A1 | 10/2009 | Peterson et al. |
| 2009/0244361 A1 | 10/2009 | Gebauer et al. |
| 2009/0265069 A1 | 10/2009 | Desbrunes |
| 2010/0002081 A1 | 1/2010 | Pawlicki et al. |
| 2010/0020170 A1 | 1/2010 | Higgins-Luthman et al. |
| 2010/0045799 A1 | 2/2010 | Lei et al. |
| 2010/0076621 A1 | 3/2010 | Kubotani et al. |
| 2010/0194886 A1 | 8/2010 | Asari et al. |
| 2010/0228437 A1 | 9/2010 | Hanzawa et al. |
| 2011/0025489 A1 | 2/2011 | Shimoda et al. |
| 2011/0074916 A1 | 3/2011 | Demirdjian |
| 2011/0095908 A1 | 4/2011 | Nadeem et al. |
| 2011/0103650 A1 | 5/2011 | Cheng et al. |
| 2011/0286544 A1 | 11/2011 | Avudainayagam et al. |
| 2012/0044066 A1 | 2/2012 | Mauderer et al. |
| 2012/0050550 A1 | 3/2012 | Oba et al. |
| 2012/0062743 A1 | 3/2012 | Lynam et al. |
| 2012/0154591 A1 | 6/2012 | Baur et al. |
| 2012/0218412 A1 | 8/2012 | Dellantoni et al. |
| 2012/0262340 A1 | 10/2012 | Hassan et al. |
| 2013/0124052 A1 | 5/2013 | Hahne |
| 2013/0129150 A1 | 5/2013 | Saito |
| 2013/0131918 A1 | 5/2013 | Hahne |
| 2013/0187445 A1 | 7/2013 | Mutzabaugh |
| 2014/0067206 A1 | 3/2014 | Pflug |
| 2014/0156157 A1 | 6/2014 | Johnson et al. |
| 2014/0160291 A1 | 6/2014 | Schaffner |
| 2014/0176711 A1 | 6/2014 | Kirchner et al. |
| 2014/0218535 A1 | 8/2014 | Ihlenburg et al. |
| 2014/0222280 A1 | 8/2014 | Salomonsson et al. |
| 2014/0313339 A1 | 10/2014 | Diessner |
| 2014/0340510 A1 | 11/2014 | Ihlenburg et al. |
| 2014/0362209 A1 | 12/2014 | Ziegenspeck et al. |
| 2014/0379233 A1 | 12/2014 | Chundrlik, Jr. et al. |

FOREIGN PATENT DOCUMENTS

| | | |
|---|---|---|
| EP | 2247047 A1 | 11/2010 |
| WO | 2010110957 A2 | 9/2010 |
| WO | 2010144900 A1 | 12/2010 |
| WO | 2011028686 A1 | 3/2011 |
| WO | 2013043661 A1 | 3/2013 |
| WO | 2013081985 A1 | 6/2013 |

OTHER PUBLICATIONS

Foresight CCTV, Inc., "Two Video with Alarm Signals Transmission Set", 2003.

|  | cable 1 | cable 2 | cable 3 | ... | ... | cable m |
|---|---|---|---|---|---|---|
| Standard 1 | X |  | X |  |  |  |
| Standard 2 | X | X | X |  |  |  |
| Standard 3 |  | X | X |  |  |  |
| ... |  |  |  |  |  |  |
| ... |  |  |  |  |  |  |
| Standard n |  |  |  |  |  |  |

FIG. 11

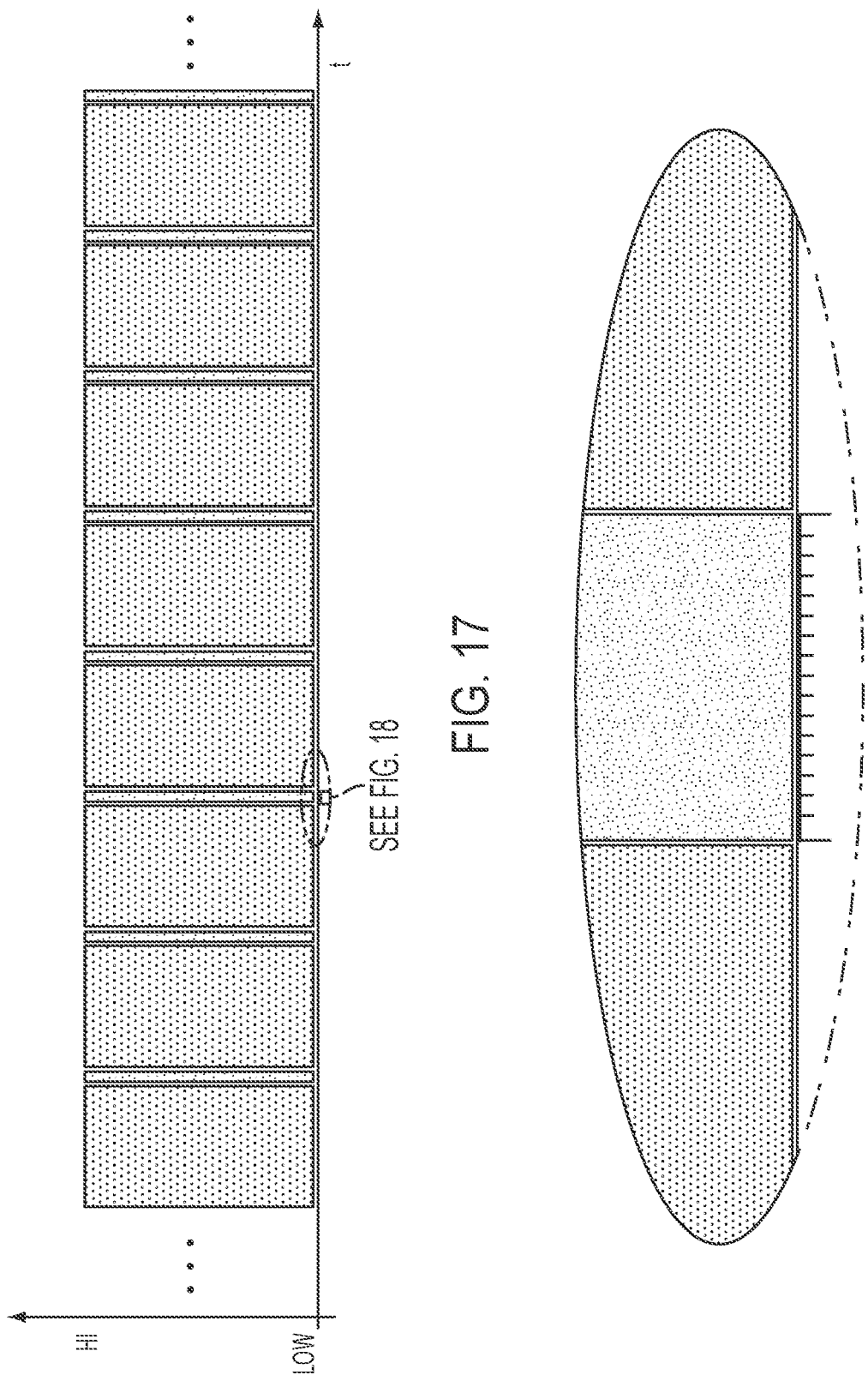

| Layer assembly | | |
|---|---|---|
| 1.1 Inner core | : | Nominal cross section 0.36 mm², Cu wires, (7 streads, max. 0.26 mm), material Cu-ETP1-A019-P according DIN EN 13602. |
| 1.2 Dielectric medium | : | foam skin (fluffed polypropylene) shore D 60 +/-5 according DIN 53505 mixture type 02YI1 close to DIN VDE 027/T2 or mixture type 9YI1 close to DIN VDE 027/T7 respectively. |
| 1.3 Foil screen | : | Al-PETP-Al_foil, longitudinal applied |
| 1.4 Outer conductor | : | plait of zinned Cu wires, max. 0.11 mm, material Cu-ETP1-A013-C according DIN EN 13602. optical covarge ~ 94% |
| 1.5 Separating | : | fleace |
| 1.6 Outer sheath | : | PUR (polyurethane) shore A 87 +/-5 according DIN 53505 requirement according DIN VDE 0282/T10, color: black |

TABLE 1: layer materials of coaxial cable of FIGS. 5 and 6 (such as FL09YHBC11Y from Polyflex®)

FIG. 19

Layer assembly 1.1 Inner core : Cu wires, (7 streads ), material Cu-ETP1-A019-P according DIN EN 13602.

1.2 Dielectric medium : FEP-perflour (ethylene-propylene-)plastic 1.3 Foil screen : Al-PETP-Al_foil, longitudinal applied 1.4 Outer conductor : plait of zinned Cu wires, material Cu-ETP1-A013-C according DIN EN 13602.

1.5 Separating : fleace 1.6 Outer sheath : PUR (polyurethane), PVC (polyvinyl chloride)

TABLE 2: layer materials of a coaxial cable in accordance with the present invention (with reference to the cable of FIGS. 7A and 8A)

FIG. 20

Layer assembly
1.1 Inner core          : stranded copper-covered steel wire, bare, 40% IACS
1.2 Dielectric medium   : PP (poly-propylen)
1.3 Foil screen         : aluminium coated foil
1.4 Outer conductor     : braid of tinned copper wires, Cu ETP1 according to EN 13602
1.5 Separating          : aluminium coated foil
1.6 Outer sheath        : TPE-U (Thermoplastic elastomers on urethane (Ethyl carbamate) basis)

TABLE 3: layer materials of a coaxial cable in accordance with the present invention (with reference to FIGs. 7b and 8b)

FIG. 21

Layer assembly 1.1 Inner core           : stranded copper-covered steel wire, bare, 40% iACS
1.2 Dielectric medium    : FEP-perflour (ethylene-propylene-)plastic
1.3 Foil screen          : aluminium coated foil
1.4 Outer conductor      : braid of tinned copper wires, Cu ETP1 according to EN 13602
1.5 Outer sheath         : PUR (polyurethane), PVC (polyvinyl chloride)

TABLE 4: layer materials of a coaxial cable in accordance with the present invention
(with reference to FIGs. 7C and 8C)

FIG. 22

VEHICLE VISION SYSTEM USING IMAGE DATA TRANSMISSION AND POWER SUPPLY VIA A COAXIAL CABLE

CROSS REFERENCE TO RELATED APPLICATIONS

The present application is a continuation of U.S. patent application Ser. No. 15/899,111, filed Feb. 19, 2018, now U.S. Pat. No. 10,284,764, which is a continuation of U.S. patent application Ser. No. 15/438,825, filed Feb. 22, 2017, now U.S. Pat. No. 9,900,490, which is a continuation of U.S. patent application Ser. No. 14/343,936, filed Mar. 10, 2014, which is a 371 national phase filing of PCT Application No. PCT/US2012/056014, filed Sep. 19, 2012, which claims the filing benefit of U.S. provisional applications, Ser. No. 61/653,664, filed May 31, 2012, Ser. No. 61/567,446, filed Dec. 6, 2011, Ser. No. 61/567,150, filed Dec. 6, 2011, and Ser. No. 61/537,279, filed Sep. 21, 2011, which are hereby incorporated herein by reference in their entireties.

FIELD OF THE INVENTION

The present invention relates to imaging systems or vision systems for vehicles and, more particularly, to a vision system that includes at least one imaging device or camera and high resolution camera data signal transfer.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a vision system or imaging system for a vehicle that utilizes one or more cameras to capture images exterior of the vehicle, and provides the communication/data signals, including camera data or image data (main channel), communication data (back channel) and the power supply, over a single or common coaxial cable.

Optionally, a system that modulates the signals (including power supply) without reduction in the amplitude may be used to provide enhanced signals over the single or common coaxial cable, may be implemented between the camera and control or ECU or the like.

Optionally, a vision system according to the present invention may include a control disposed at the vehicle, and when initially powering up the vision system, a transceiver of the imaging sensor is tuned to an initial communication mode, which is suitable for communication with the control and/or a communication interface of the vision system and/or a display device of the vision system.

The present invention also provides a vision system or imaging system for a vehicle that utilizes one or more cameras to capture images exterior of the vehicle, and provides the communication/data signals, including camera data or image data, that may be processed and, responsive to such image processing, the system may detect an object at or near the vehicle and in the path of travel of the vehicle, such as when the vehicle is backing up. In order to calibrate the system and camera or cameras, the present invention provides camera side band data transmission by overlay of calibration data or codes to the sent or communicated image or image data.

According to another aspect of the present invention, a vision system for a vehicle includes a camera or image sensor disposed at a vehicle and having a field of view exterior of the vehicle, and a processor operable to process data transmitted by the camera. The camera is operable to automatically transmit calibration data or codes and the processor is operable to receive the calibration data or codes transmitted by the camera. The camera automatically transmits the calibration data or codes when the camera is triggered to transmit the calibration data or codes. The vision system, responsive to receipt of the calibration data or codes, is operable to identify the camera and associated calibration codes or data. The calibration data or codes may comprise an overlay or graphic or pattern overlay in the image data captured by the camera and transmitted by the camera to the processor.

Optionally, the camera may automatically transmit the calibration data or codes responsive to an initial activation of the camera and/or the vision system. Optionally, the camera may automatically transmit the calibration data or codes responsive to detection of a particular pattern or the like in the field of view of the camera.

These and other objects, advantages, purposes and features of the present invention will become apparent upon review of the following specification in conjunction with the drawings.

BRIEF DESCRIPTION OF THE DRAWINGS

FIG. 11 is an example of a n×m matrix for minimizing the amount of necessary camera connector interface standards 'n' to cable variants 'm';

FIG. 17 is an example of a time scheme transferring camera data during a vertical blanking interval, with the time of the blanking interval being relatively small compared to the time it takes to transfer an image frame, shown with dark gray: camera data; light gray: image data; and white: no data);

FIG. 18 is the zoomed out timeframe of the vertical blanking time interval of FIG. 17, shown with 16 data bit being transferred within one interval, and shown with dark gray: camera data; light gray: image data; very dark gray: high pulse (positive bits) within vertical blanking interval; and white: no data); and FIGS. 19-22 are tables showing elements of coaxial cables.

DESCRIPTION OF THE PREFERRED EMBODIMENTS

Figure 1:
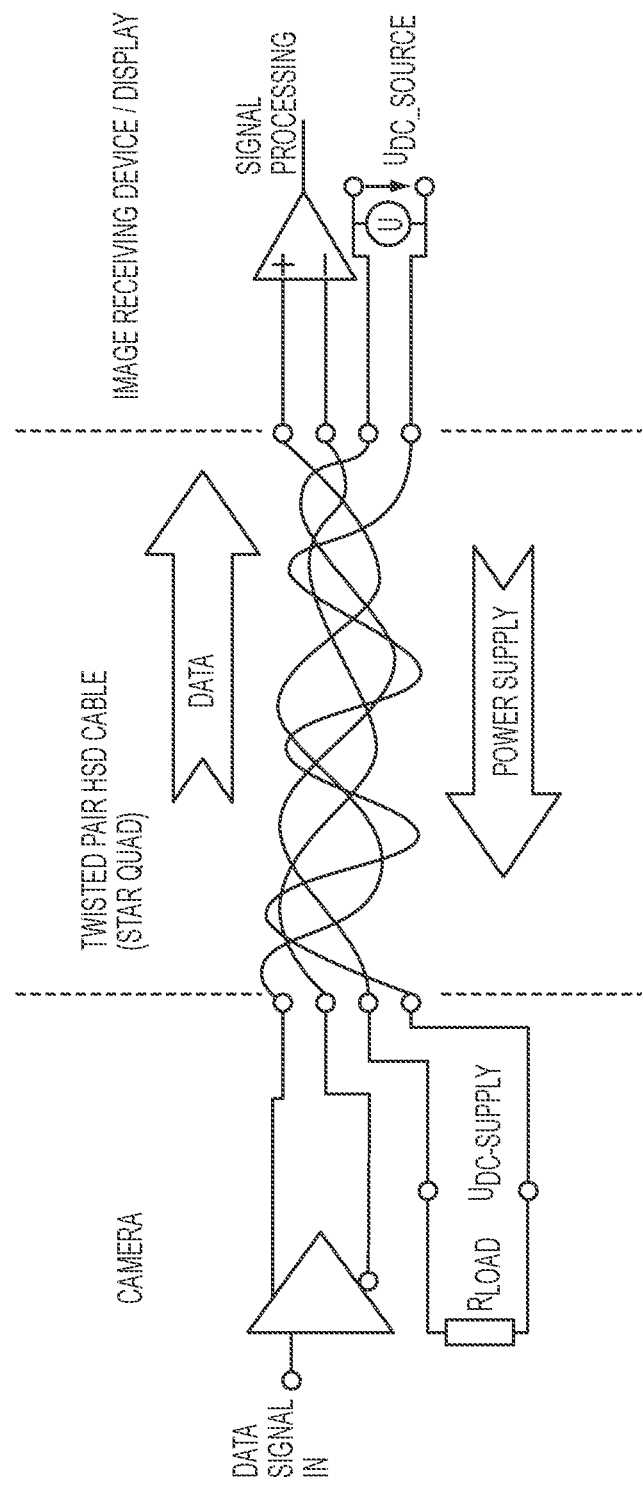
FIG. 1 is a diagram of a state of the art symmetric LVDS transfer and DC supply via twisted pair cable using four independent lines.
Figure 2:
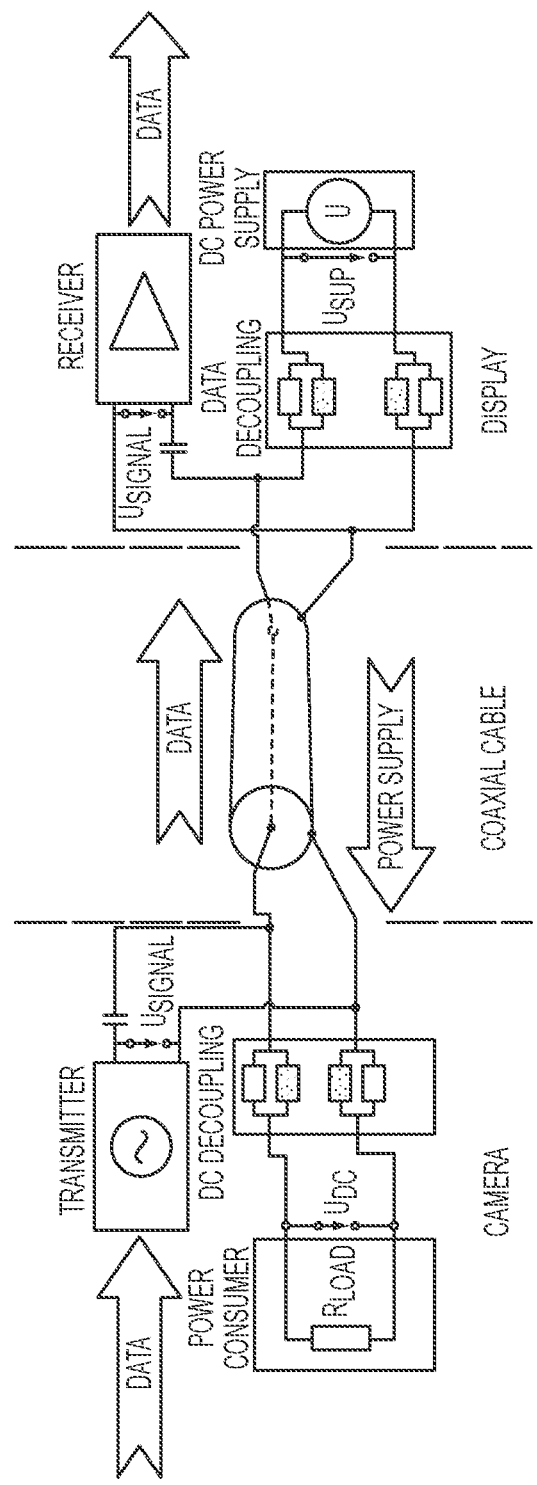
FIG. 2 is a diagram of a state of the art LVDS transfer and DC supply via a single core coaxial cable with shield, having inductive data/power decoupling and current modulated signals, used in an automotive camera application.
Figure 3:
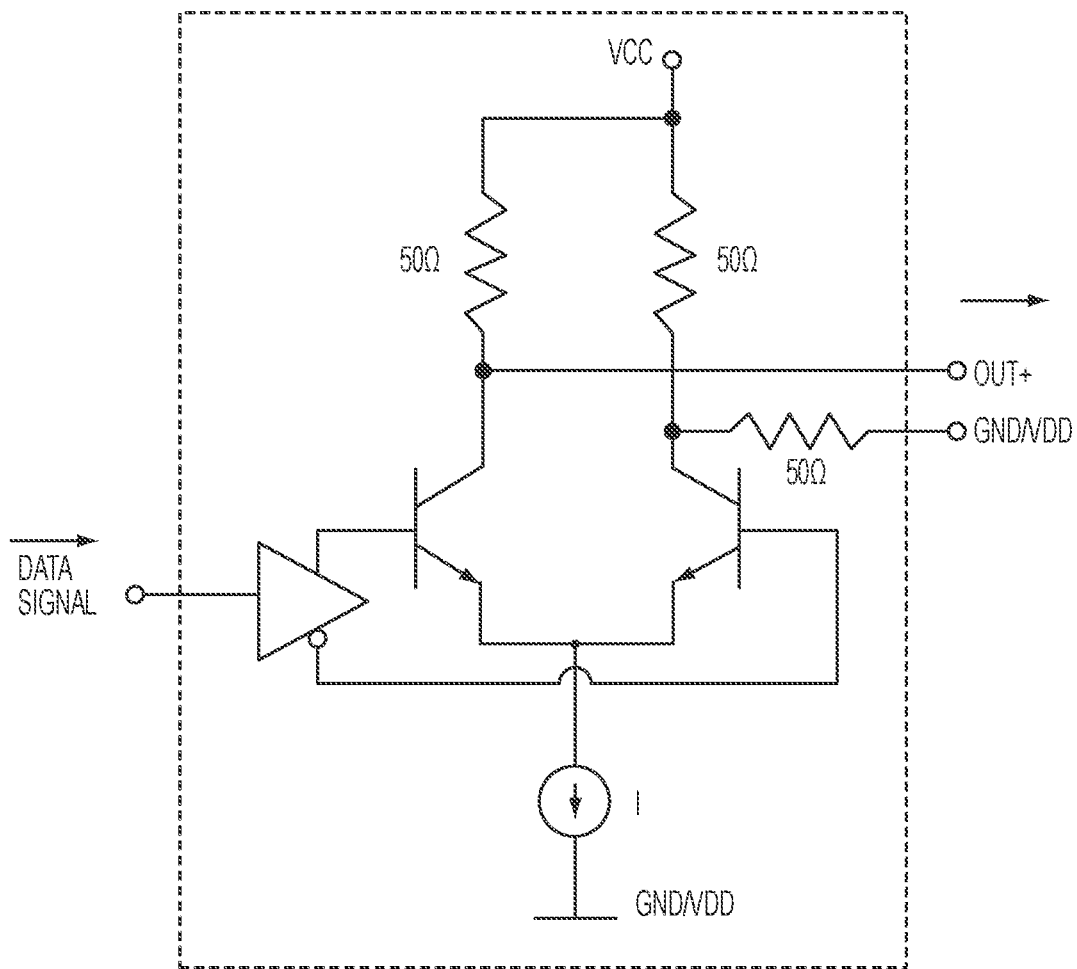
FIG. 3 is a schematic of signal generation via a symmetric LVDS driver chip, having pulled one driver side to ground, to be used with a transmitter according FIG. 2.

Low-voltage differential signaling (LVDS) is known, such as described in U.S. Pat. No. 7,843,235 (and such as shown in FIG. 1), and EP Publication No. EP000002247047A1 (asymmetric LVDS, such as shown in FIGS. 2 and 3), and asymmetric LVDS drive stage chips and automotive applications have been proposed, such as by EQCOLOGIC® (see http://www.eqcologic.com, LVDS driver via coax application examples for automotive cameras), which are all hereby incorporated herein by reference in their entireties.

Figure 5:
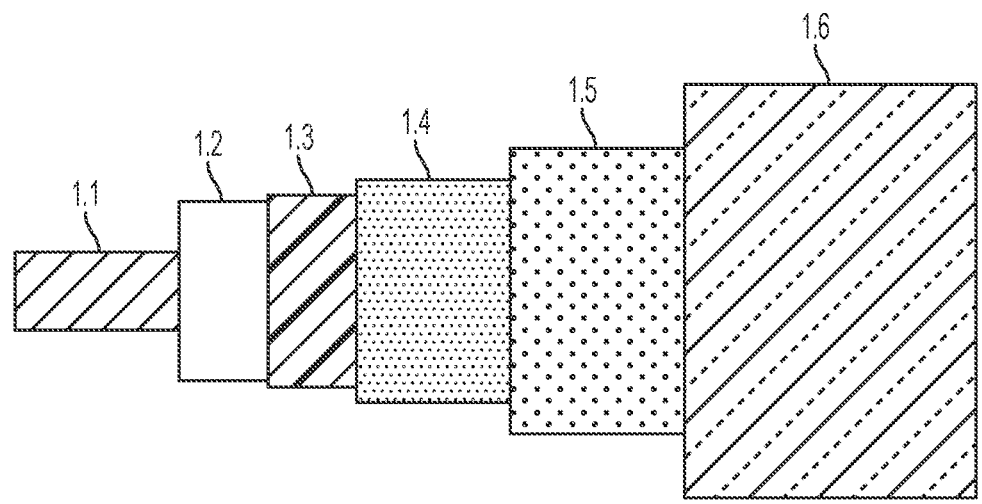
FIGS. 5 and 6 are schematic layer build ups of state of the art coaxial cable (such as a cable of the type FL09YHBC11Y from POLYFLEX®), known for use from analog image transmission in automotive and LVDS transmission for home entertainment devices.
Figure 6:
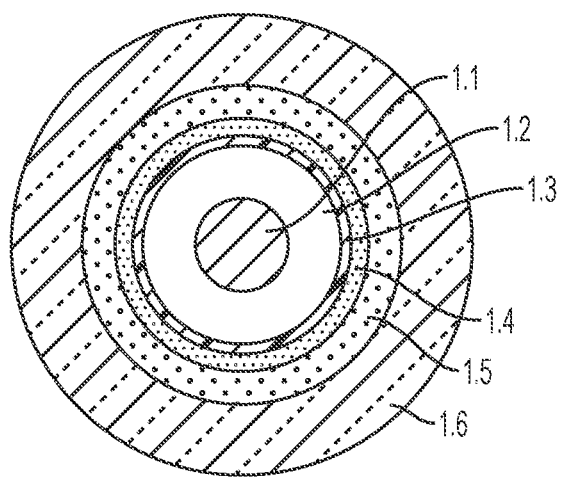

Coaxial cables used for LVDS are known from Figures in EP000002247047A1 and the cable itself by cable supplier specifications, such as, for example, a POLYFLEX® type of cable commercially available as FL09YHBC11Y (see FIGS. 5 and 6 and Table 1 of FIG. 19).

Figure 9:
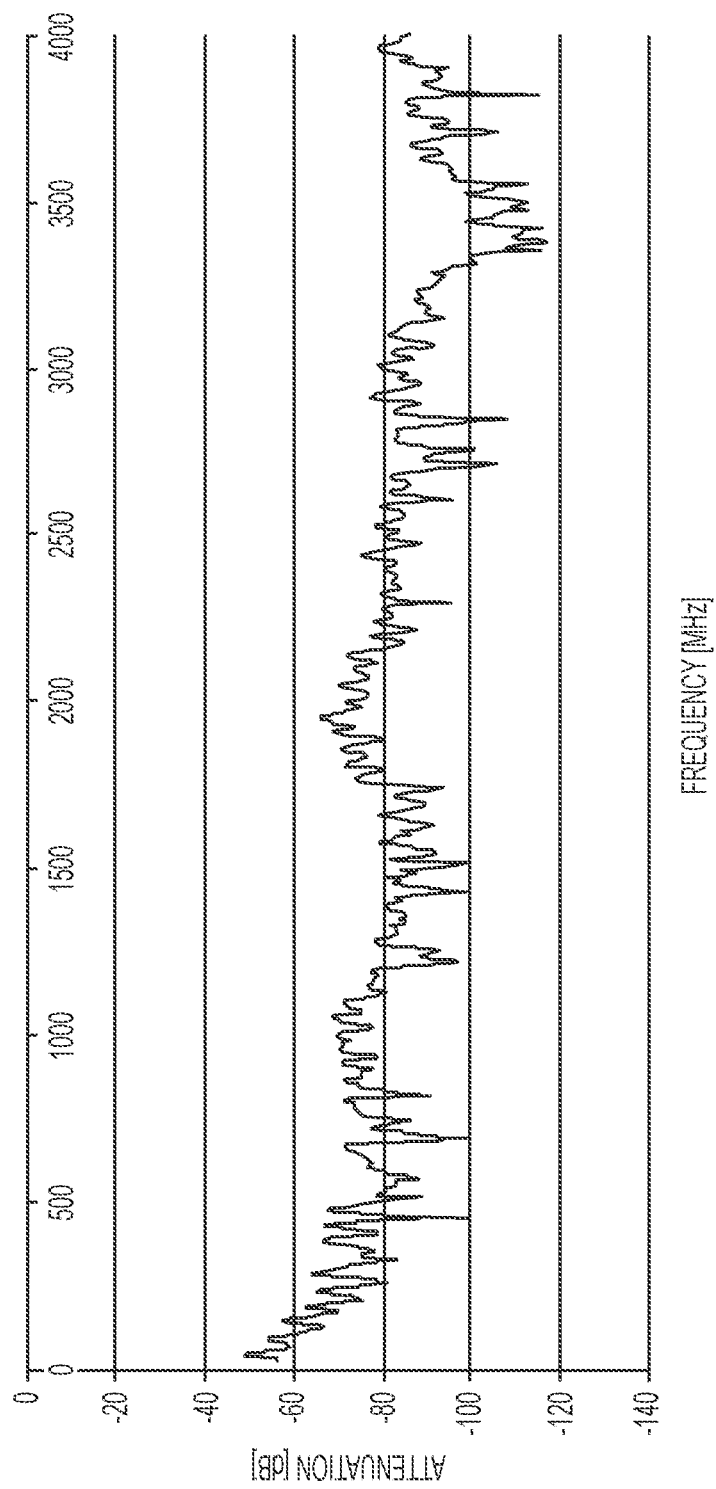
FIG. 9 is a diagram of signal attenuation over frequency of a state of the art HSD (high speed data) twisted pair cable (such as a Leoni Dacar 535-2 cable)

Automotive high resolution camera data signal (stream) transfer for cameras in automotive doors (side mirrors) and hatches cables must be robust due to bending. The data signal transfer and the screening attenuation must be sufficient to cope with automotive EMC tests and must attain a high enough data rate. The non-coaxial HSD-cables may provide a good screening attenuation (see FIG. 9), but are typically much more expansive, are typically hard to assemble connectors, are typically hard to maintain in workshops, and are typically worse in bending capabilities (the twisted pair multi core wires tend to lose their arrangement, so the dielectric performance diminishes).

Single core coaxial cables are highly symmetric. Because of this, such a cable provides enhanced bending capabilities than those of multi-core coaxial cables and (non-coaxial) HSD-cables because it's structural geometrics do not get out of order as readily. The attenuation performance is comparable to that of HSD cables. The connectors are easy to apply and are readily maintained. Thus, there is a reduced desire to use coaxial cables for automotive high resolution camera data signal transfer.

Asymmetric signal transfer with LVDS + and − driver stages with one driver side set to ground over 50 ohms (such as shown in FIG. 3) show the disadvantage of a 50 percent signal strength loss. State of the art coaxial cables hardly meet automotive requirements in combination of bending capability and attenuation performance.

Figure 4A:
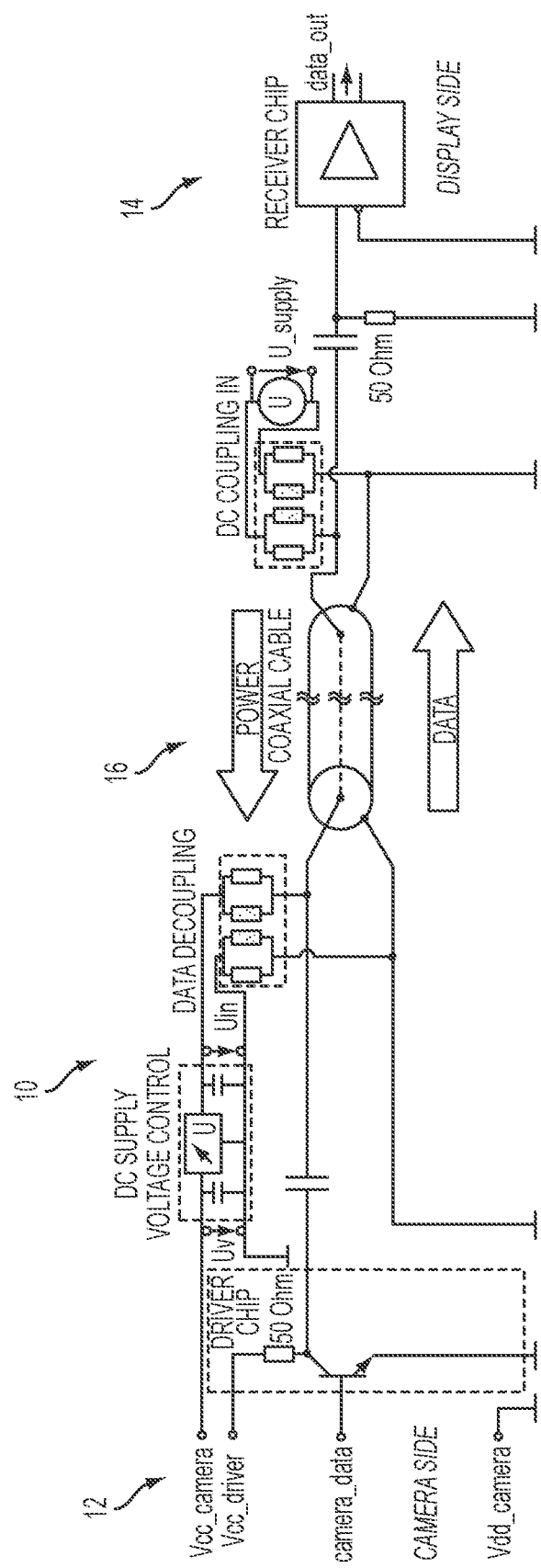
FIG. 4A is a schematic of an asymmetric LVDS transmission and DC supply via a single core coaxial cable with shield, having inductive data/power decoupling and current modulated signals using an asymmetric signal driver, applied in an automotive camera system in accordance with the present invention.

Thus, enhanced signal transfer is desired, and this may be achieved by using a single side driver stage for asymmetric signal line transfer, such as shown in FIG. 4A. As shown in FIG. 4A, the negative line driver has been eliminated, which simplifies the circuit. Thus, the signal to noise ratio of the transmitter gets improved substantially (such as by nearly 100 percent or thereabouts).

To divide data (AC) from supply currents (DC) decoupling filters are in use. The may filter both the ground/negative signal line (coaxial cable shield) and the power/positive signal line as to be seen in FIG. 4A) or more simplified just one node as to be seen in FIG. 4B.

The decoupling filters maintain inductors. As higher the signal frequency becomes chosen as smaller the filter inductors can be chosen according following equations:

$$Z=\omega L$$

$$\omega=2*\pi*f$$

$$Z=2*\pi*f*L$$

Figure 7A:
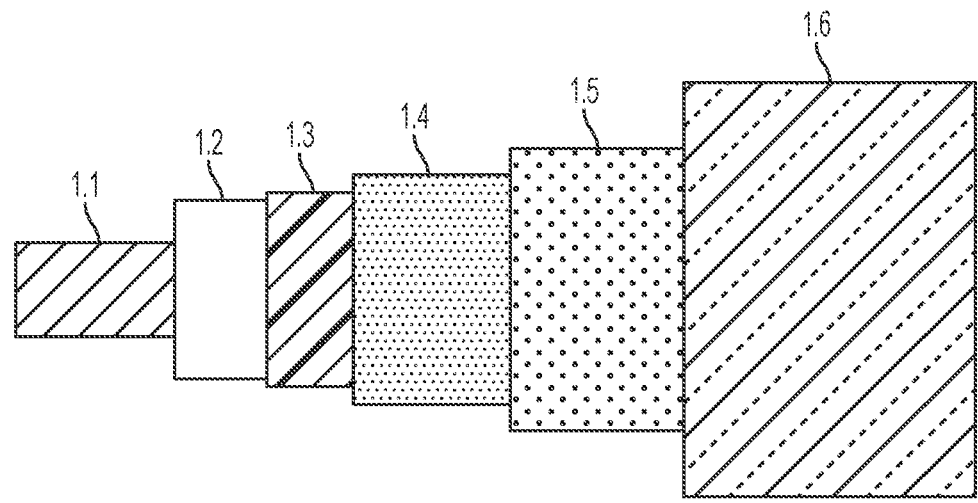
FIGS. 7A and 8A are schematic layer build ups of coaxial cable, using advanced materials for improved bending capabilities and having automotive compatible signal attenuation.
Figure 8A:
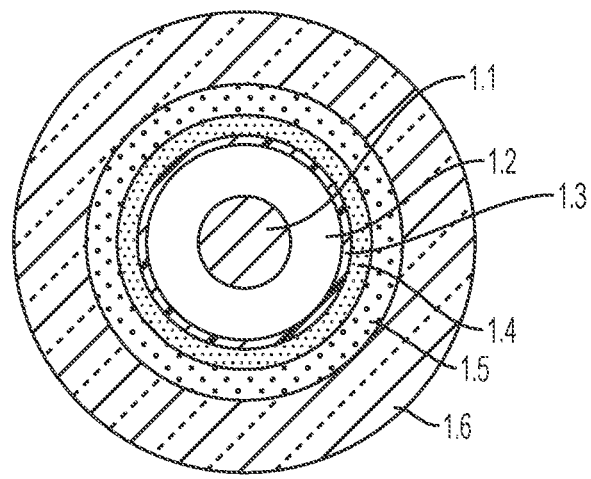
Figure 10:
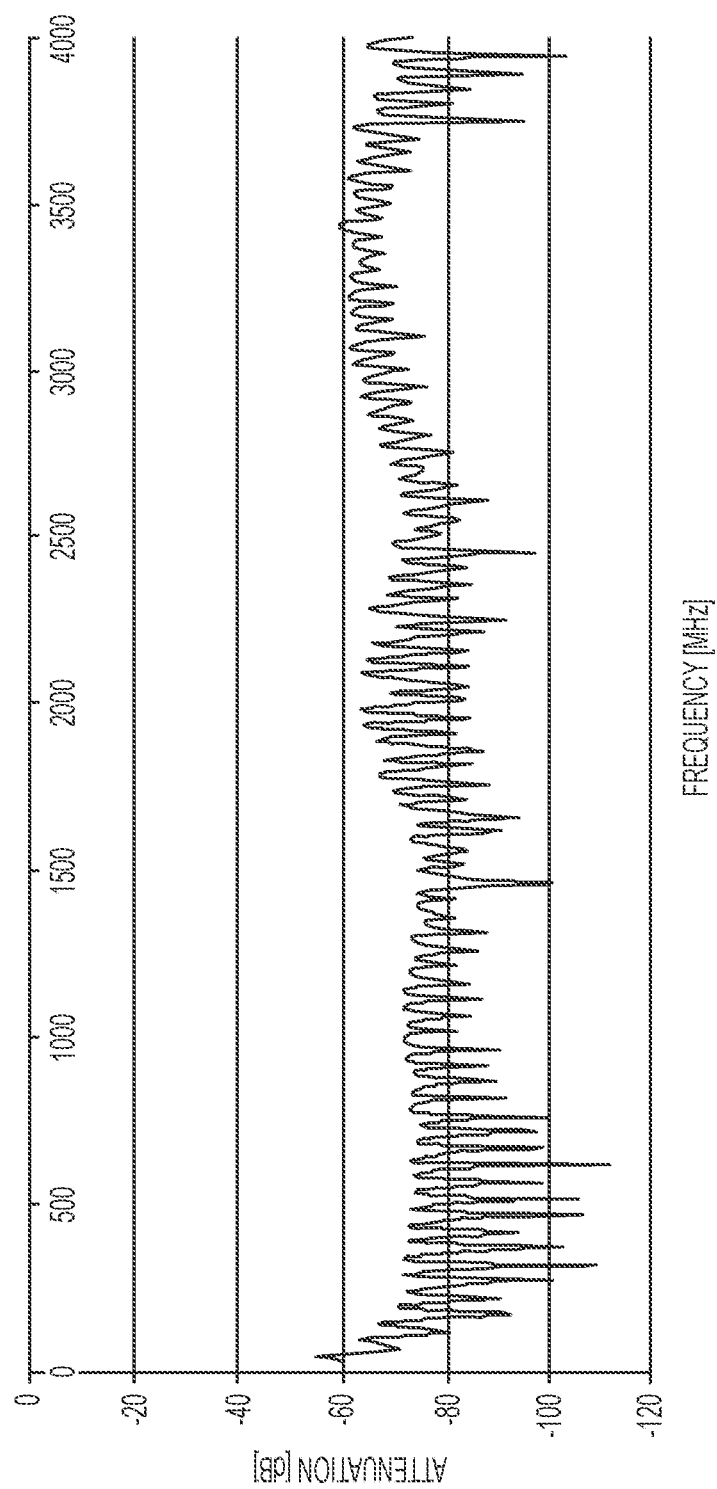
FIG. 10 is a diagram of signal attenuation over frequency of a coaxial cable according FIGS. 7 and 8, in accordance with the present invention.
Figure 12:
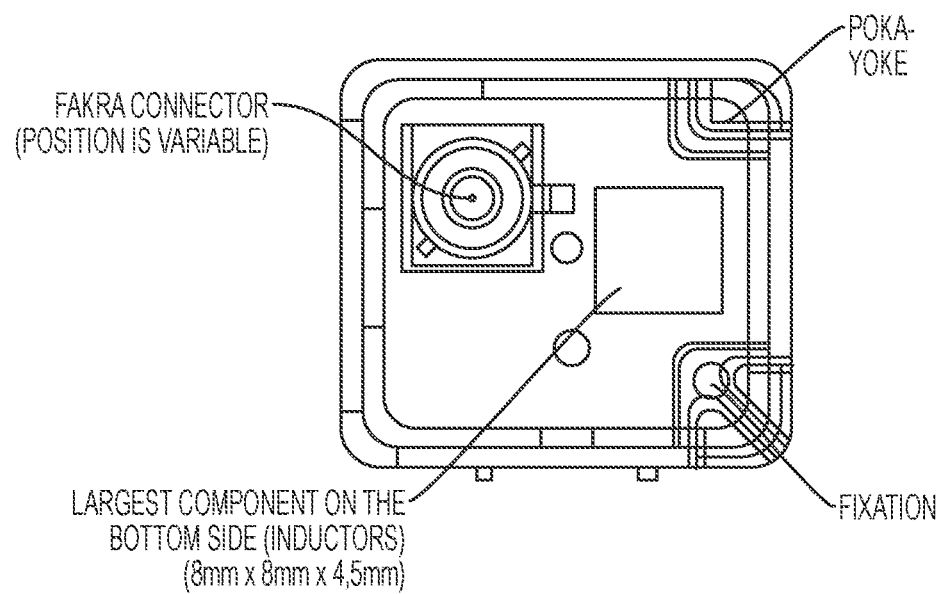
FIG. 12 shows a front view of a common (FAKRA™) single core coaxial cable connector interface according to the present invention, as applied on an automotive camera printed circuit board (PCB)
Figure 13:
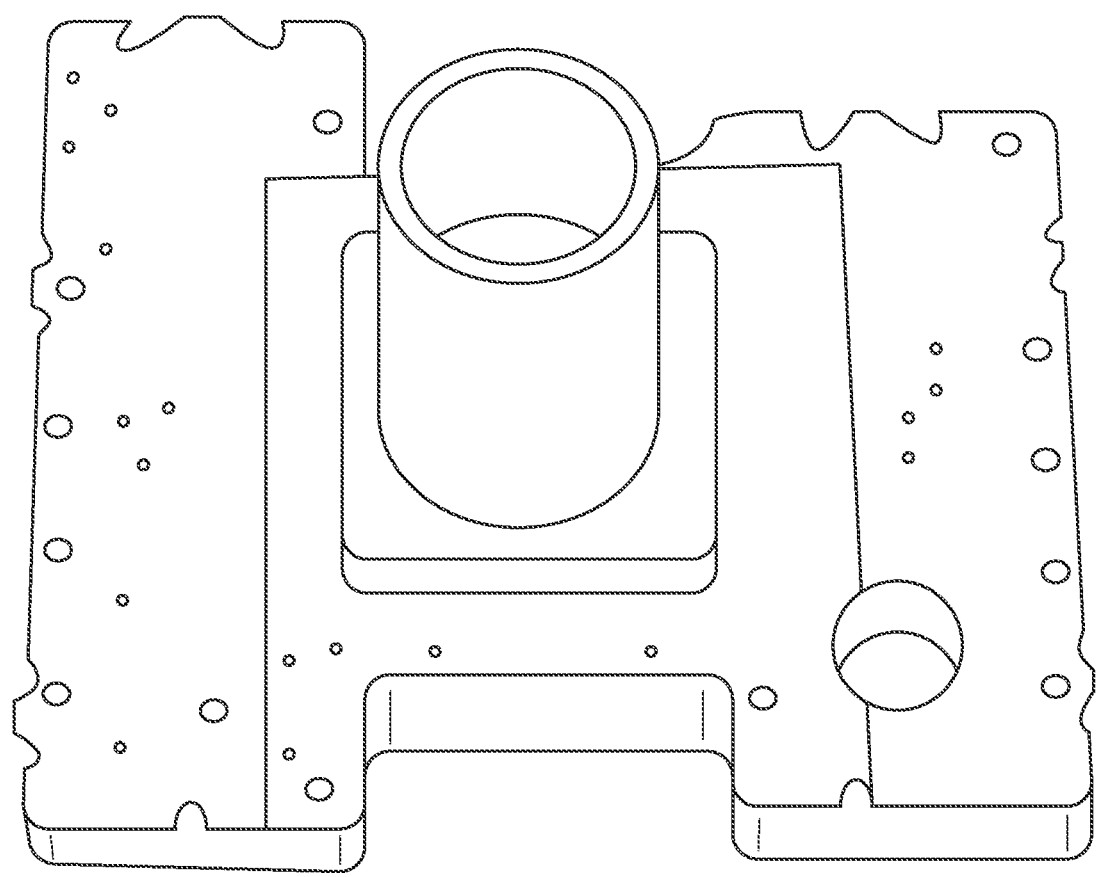
FIG. 13 shows a rear view of a common (FAKRA™) single core coaxial cable connector interface according to the present invention, as applied on an automotive camera PCB, with the interface (m) optionally used for several data transmission standards (n) according to the matrix of FIG. 11.

It is also desirable to provide enhanced bending capability and attenuation performance for automotive applications. This can be achieved by using a fluorinated ethylene propylene (FEP) perfluoroethylene-propylene plastic in the insulation layer of LVDS coaxial cables. Such a construction provides enhanced elasticity, and has comparable dielectric performance (such as shown in FIG. 10), and makes the cable more robust on repeated bending. Additionally, when combined by using a PUR-PVC material in the sheath, the cable construction also makes the cable easier to bend and mechanically more robust (see FIGS. 7A and 8A and Table 2 of FIG. 20).

Figure 8B:
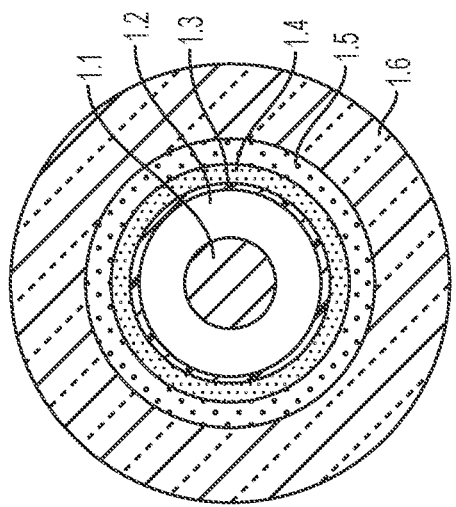
FIGS. 7B and 8B are second examples of schematic layer build-ups of coaxial cable, using advanced materials for improved bending capabilities and having automotive compatible signal attenuation.
Figure 7B:
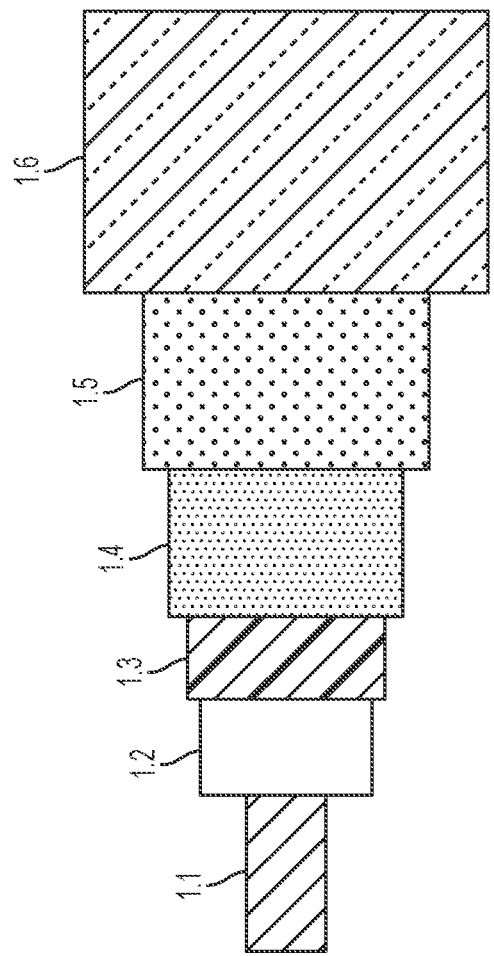
Figure 7C:
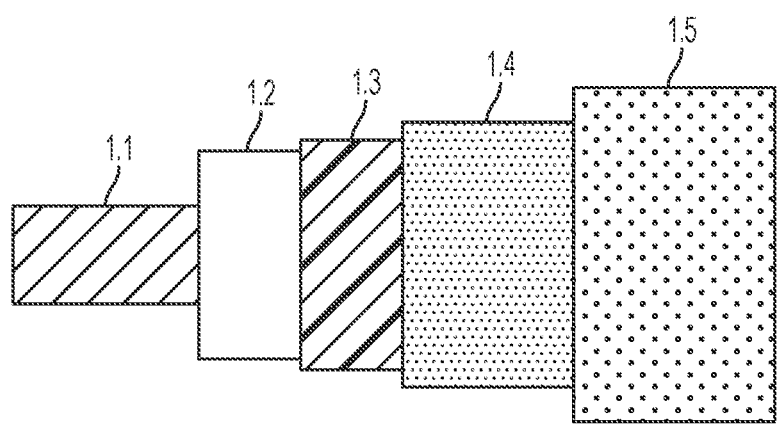
FIGS. 7C and 8C are third examples of schematic layer build-ups of coaxial cable, using another set of advanced materials for improved bending capabilities and having automotive compatible signal attenuation.
Figure 8C:
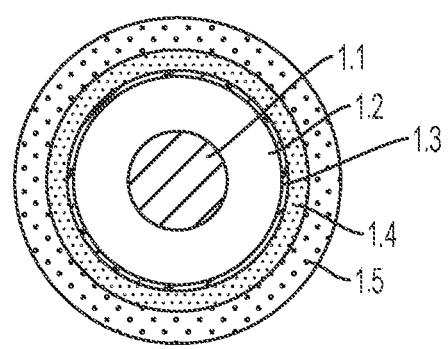

Enhanced bending capability and attenuation can also become achieved by using a PP (poly-propylene) foam skin as a dielectric medium and optionally an aluminum foil instead of a separating fleece. Such a construction provides enhanced elasticity, and improves the attenuation further due to the additional shielding layer 1.5 (see FIGS. 7B and 8B and Table 3 of FIG. 21). Optionally, and with reference to FIGS. 7C and 8C and Table 4 of FIG. 22, another schematic of layer build-ups of coaxial cable is shown, using another set of advanced materials for improved bending capabilities and having automotive compatible signal attenuation, in accordance with the present invention.

Such cables achieve high bending when the bending radius is higher than about 10 times the diameter, and are automotive temperature (such as about −40 degrees C. to about 125 degrees C.) capable. The attenuation stays below around 100 dB (nominal) at about 1 GHz, and about 150 dB at about 2 GHz and about 180 dB at about 3 GHz per 100 m cable or thereabouts.

Figure 4B:
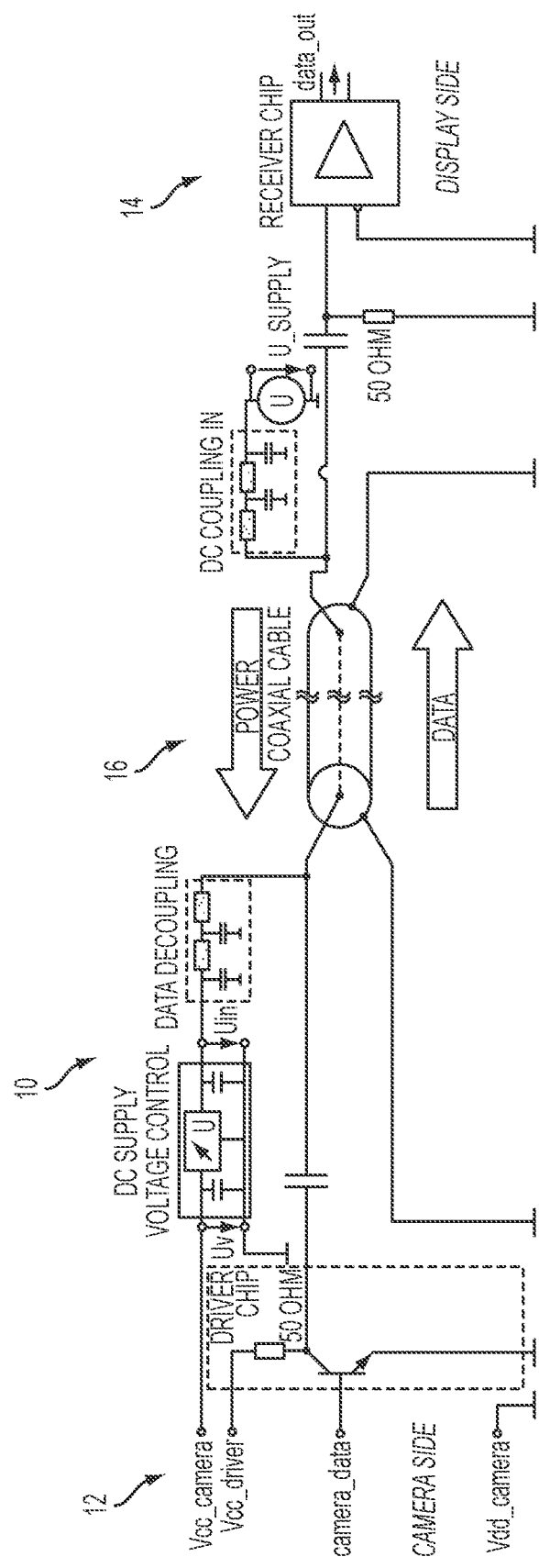
FIG. 4B is a schematic of an asymmetric LVDS transmission and DC supply via a single core coaxial cable with shield, having inductive data/power decoupling and current modulated signals using an more simplified asymmetric signal driver and data decoupling filters in comparison to the embodiment shown in FIG. 4A, as applied in an automotive camera system in accordance with the present invention.

Thus, and with reference to FIGS. 4A and 4B, a vehicle may an imaging system or vision system 10 that includes at least one imaging sensor or camera 12, which capture images (such as images interior or exterior of the vehicle), and which communicates image data to a control system or control or processor or display system 14 via a communication link 16. The communication link 16 comprises a single coaxial cable that communicates power supply to the camera 12 and camera or image data from the camera 12 to the control 14. The present invention thus provides a means to communicate or send all data, including camera data or captured image data (main channel), communication data (back channel) and the power supply over a single or common link or coaxial cable.

Devices or systems supporting coaxial cables are developing. With full duplex devices, the system can send just over the low-voltage differential signaling (LVDS) + pin with LVDS− pin over 50 Ohm to ground. Thus, the system may provide only about half of the signal amplitude, but this is sufficient to send at least about 1.6 Gbps over about a 15 m coaxial cable without any errors. Various suitable coaxial cables may be used to pass the OEM requirements. For example, the system may include serial link chipsets at the ends of the cable or link, such as, for example, a MAX9259 chipset at the camera end of the link and a MAX 9260 deserializer chipset at the display end of the link, such as are commercially available from Maxim of Sunnyvale, Calif., which provides a gigabit multimedia serial link (GMSL) technology. The MAX9259 serializer may pair with the MAX9260 deserializer to form a complete digital serial link for joint transmission of high-speed video, audio, and control data.

The chipsets may be implemented with a suitable coaxial cable, such as, for example, a 50 Ohm coaxial cable that provides up to about a 12 dB loss. Suitable cables include, for example, a Leoni Dacar 037 cable, a Leoni Dacar 320 cable, a Leoni Dacar 642 cable, a Leoni Dacar 380 cable, a LEONI DACAR® 4xx-KOAX-C-50-1,52-2,8/T125 cable, a Kroschu 64918930 cable, a Kroschu 64924651 cable or a Gebauer & Griller FL09YHBC11Y 0,35(0,26)2,1 KX 50/1 cable, or the like.

Optionally, a vision system may incorporate a system that provides bidirectional full duplex communication over a single coax cable. For example, the system may comprise an EQCO850SC single coax transceiver/system (commercially available from Eqcologic USA of Flower Mound, Tex. Such a system is designed to simultaneously transmit and receive signals on a single 75 Ohm coax cable up to about 1.25 Gbps in both directions. The power supply can be delivered in parallel over the same coax by a current up to about 900 mA. Such a system is compatible with LVDS, CML and other NRZ differential signaling means. Such a device or system may modulate all signals inclusive of power supply to one signal which can be communicated or sent over a single or common coax cable with low or minimal loss of signal amplitude (about 100 dB (nominal) at about 1 GHz, about 150 dB at about 2 GHz and about 180 dB at about 3 GHz per 100 m cable or thereabouts) and without any requirement to have a full duplex system. Optionally, the vision system may incorporate any suitable coax cable, such as a 75 Ohm coax cable or a 50 Ohm coax cable or the like. The present invention thus supplies DC power and image data over the same coaxial line in an automotive vision system.

In automotive vision and safety cameras, it is known to provide a single data communication transmitter/transceiver (-type) for transmitting images and/or control data to a receiving unit, which may comprise a display, a mobile device, a head unit or any other image processing device or the like. The image processing device typically has one corresponding interface matching to the transmitting interface (bus) type. The vision system may include a digital bus or an analog interface or both.

Typically, an expensive part of an automotive vision system's hardware supply is the logistics. Instead of adapting the interfaces of equal cameras or visual detecting devices or the like (such as cameras or imaging sensors or the like) to different image processing device's (different) interfaces or having two interface plugs on one camera (which takes a lot of precious space, limits design flexibility and is more costly), a more lean and cheaper solution is on demand.

The present invention provides a vision system that has a camera that is adaptable for interfacing with different processors and/or control devices or the like.

(1) It is acknowledged that there are a number ("n") of video standards (digital and analog) and a number ("m") of kinds of video cables and connectors. Putting m×n into relation there is a finite amount of combinations which cover all demands for a camera interface. The present invention provides a solution that has a small amount of camera variants which differ in the kind of connectors. Cameras typically have in common that they need at least two different transceiver chips on board or transceivers which are capable of maintaining more than one transmission protocol (or transmission standard or norm) or a mix of these, both analog and/or digital. Also, all kinds of emulating of protocols meant by that.

(2) Because of this, the cameras can be common or kept identical or substantially identical, if the cameras have modes that are switched by parameters and that are adjusted to adapt a camera to a specific display device, image controller or head unit or the like. The present invention provides a vision system that, when powering up the vision system, such as in an initial phase, preferably at the first activation of the camera or system or after replacing a camera, the camera's transceiver (or transmitter) gets tuned into an initial or primitive communication mode, which can be maintained by every display device and camera's communication interface (hardware and software).

(3) According to (2), above, the parameters needed for setting up the vision system's camera(s), especially the setup of the chosen communication protocol, may be transmitted in the primitive mode initial phase.

(4) According to (3), above, after receiving the code for the chosen communication protocol (mode), the camera and the display device continue to communicate via the chosen communication protocol using the according transceiver hardware mentioned above.

(5) According to (2), above, the cameras parameters or a part of it, may get held and/or updated in the display device.

(6) According to (2), above, in the initial phase, the camera is (or the cameras are) running a self-configuring routine and are initializing itself/themselves by image data or other preset parameters or sensing data or data transmitted to them by any kind of data transmission. The cameras may communicate between each other and/or over the display device for that.

(7) According to (6), above, the result of the self-configuration is to determine on which place the camera is mounted (at the vehicle).

(8) According to (7), above, the result of the self-configuration is furthermore to do a stitching and alignment calibration, especially for calibrating means of determining magnitude and distances.

(9) According to (1), above, the different connectors may comprise coaxial cable connectors (Interfaces) or RJ45 or the like.

(10) According to (1), above, the different cables may comprise coaxial cable, shielded twisted pair (STP), unshielded twisted pair, USB cable, HDMI cable or the like.

(11) According to (1), above, the different transmission protocols or standards may comprise NTSC, PAL, SECAM, Ethernet, Gigabit Multimedia Serial Link (GMSL), FDP-Link I, FDP-Link II, FDP-Link III, Pixel Link, USB, CAN, LIN, Flexray, Devicenet, Interbus, Modbus, Profibus, ASI, composite video, S-Video, SCART, component video, D-Terminal, VGA, HDMI, DVI, HDCP or other according the EIA/CEA-861 standard, or the like.

(12) According to (1), above, when enabling one transceiver on the camera, the other transceiver may be disabled.

(13) According to (12), above, the disabled transceiver outputs are high impedance or have filters making sure that the signals of the enabled transmitter are not influenced by the driver stages circuits of disabled transmitters, which share the same connector nodes.

(14) According to (10), above, the transmission cable may also be used as power line for supplying the camera and/or other devices or sensors.

(15) According to (10), above, the transmission cable grid between camera(s) display device(s), power sources, sensor (s), actuators, and the like may be set up as a ring, a star, or a mixture of both.

(16) According to (15), above, there may be also wireless cameras, mobile infotainment and other devices on the grid.

(17) According to (16), above, there may be also bus gateways in between the grids nodes.

Thus, the present invention provides an interface, connector and transmission cable standardization on automotive camera systems. The vision system of the present invention incorporates one or more cameras that are configured or adapted to communicate with various types of communication or data transfer cables and various types of transmission protocols. The cameras for a given system and/or for various systems on different vehicles, can be common or kept identical or substantially identical, and the modes are switched by parameters becoming adjusted to adapt a camera to a specific display device, image controller or head unit or the like.

The present invention also provides a vehicle vision system and/or driver assist system and/or object detection system and/or alert system operates that is operable to capture images exterior of the vehicle and to process the captured image data to detect objects at or near the vehicle and in the predicted path of the vehicle, such as to assist a driver of the vehicle in maneuvering the vehicle in a rearward direction. The vision system includes a processor that is operable to receive image data from a camera and may receive calibration data or codes from the camera when the camera is initially powered or activated or when the camera is otherwise triggered to send or transmit the calibration data (such as responsive to a triggering event such as an initial activation of the camera or system or an input to the camera or system or a detection of a particular pattern or the like in the field of view of the camera), such that the system can identify the camera and its calibration codes such that the vision system may be automatically calibrated for operation, without any manual inputs or reading of physical labels or the like at the camera.

Figure 14:
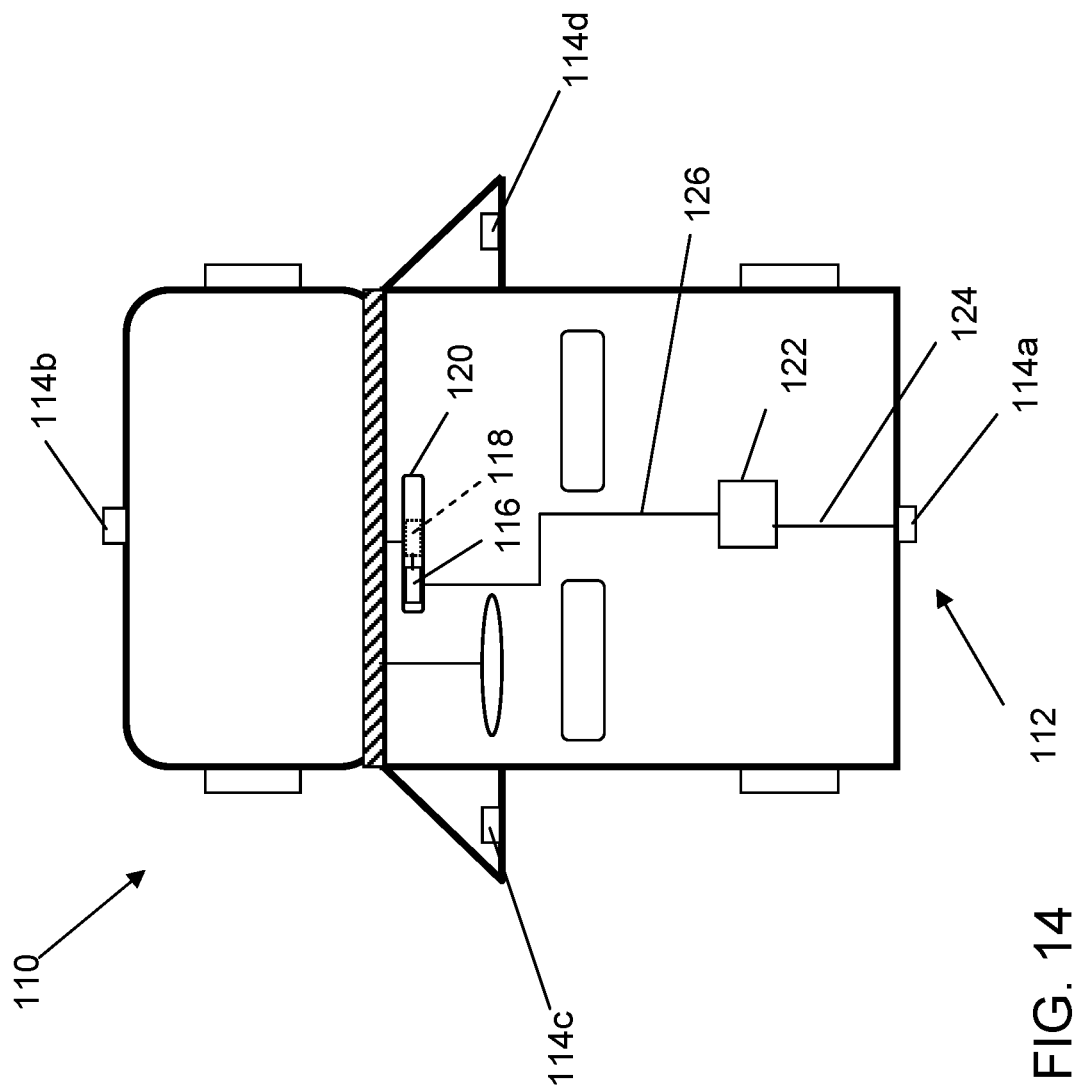
FIG. 14 is a plan view of a vehicle with a vision system and imaging sensors or cameras that provide exterior fields of view in accordance with the present invention.

Referring now to FIG. 14, a vehicle 110 includes an imaging system or vision system 112 that includes one or more imaging sensors or cameras (such as a rearward facing imaging sensor or camera 114a and/or a forwardly facing camera 114b at the front (or at the windshield) of the vehicle, and/or a sidewardly/rearwardly facing camera 114c, 114b at the sides of the vehicle), which capture images exterior of the vehicle, with the cameras having a lens for focusing images at or onto an imaging array or imaging plane of the camera (FIG. 14). The vision system 112 includes a control or processor 118 that is operable to process image data captured by the cameras and may provide displayed images at a display device 116 for viewing by the driver of the vehicle (although shown in FIG. 14 as being part of or incorporated in or at an interior rearview mirror assembly 120 of the vehicle, the control and/or the display device may be disposed elsewhere at or in the vehicle) and a control device (MCU) 122. The rear facing image sensor is connected to the MCU by a monodirectional data line or bus 124, and the display device 116 is connected to the control device 122 via a data line or bus 126 (the image giving devices 114b, 114c, 114d may also be connected to the control device 122 but their data lines are not shown in FIG. 14). Optionally, the control or processor of the vision system may process captured image data to detect objects, such as objects to the rear of the subject or equipped vehicle during a reversing maneuver, or such as approaching or following vehicles or vehicles at a side lane adjacent to the subject or equipped vehicle or the like.

Vehicle vision system cameras have interfaces to send or transmit or communicate image data and further channels to communicate control and configuration data to image processing units, head units or display units or the like. These units may be part of the vehicle's sensor cluster or driver assistance system or the like.

In order to enhance cost efficiency, vision system cameras typically have as few interfaces as possible. Some known cameras have just an image output, such as an NTSC output or the like, but no further data output. Such cameras are typically calibrated during their assembly (by the supplier). The calibration data may be provided to the OEM installing those cameras on vehicles. For example, the data may be labeled onto the housing of the camera, such as by lasering, sticking, printing and/or the like, or in the bar codes in a one dimensional (1D) code or a two dimensional (2D) matrix and/or the like. These can be read by scanners at the OEM's vehicle assembly line when installing the cameras on or at the vehicles. Alternatively, every camera's calibration data set can be stored in a database which may be accessed by the OEM to read the according data set at the time the camera is assembled to a vehicle on the OEM's vehicle assembly line. Such a process necessitates identifying every camera. Hence, at least the serial number must be identified on each camera that is installed on a vehicle.

In cases where a vehicle vision system's camera has to be replaced by a repair service, the calibration set up of the old camera has to be replaced by a calibration set up of the new camera. This is typically to be done manually at the vehicle service station or repair shop.

The data handling of vision system camera's calibration sets is simplified by the present invention. The necessity for printing, installing or sticking labels to identify each camera or its specific data set may be obviated or eliminated. The camera of the vehicle vision system of the present invention is enabled to automatically transfer its calibration data set to a vision processing unit, head unit or display device or the like, especially after servicing of the camera or vehicle vision system.

Vehicle vision system's cameras that have just one port, such as an NTFS image channel, shall communicate over the port and communication link with the vision head unit or the like. Identification of the camera and parameters of the camera and especially the calibration data sets, which may be stored in a camera internal non-volatile memory as a bitmap, will be transferred to and received and understood by the head unit or control or processor. By that, the camera calibration can be transmitted automatically on the customer (OEM) line or after replacing or servicing the vision system and/or individual camera or cameras.

In accordance with the present invention, the camera identification, parameters and calibration sets of vision system cameras can be stored in an internal non-volatile memory, such as a bitmap or bitmap like pattern. The calibration set or sets is/are transferred to an image processing device through the image channel, such as a NTSC, NTFS, PAL or SECAM channel or protocol. The calibration set that is transferred through the image channel gets coded by a specific manner of coding. For example, the transferred or transmitted calibration set may be coded by an image pattern from which the camera's calibration can be restored by the receiving image processing device.

Optionally, the transferred or transmitted calibration set may be coded by using bar codes which appear as an overlay to the image. For example, the calibration code may be coded by a 1D bar code, or by a 2D matrix code or the like. Optionally, the calibration code overlay may comprise a color value or color tone or color pattern or the like.

The calibration data set is coded by data conjuncted, bound or added to the image or image data picked up or captured by the camera. The calibration is bound to the image picked up by the camera via any suitable means, such as by a steganography algorithm or the like. Symmetric steganography finds use here, having private keys on the coding/encrypting side and on the uncoding/uncrypting side. Asymmetric steganography finds use here, having a private key on the coding/encrypting side and a public key on the uncoding/uncrypting side.

The calibration code may be transferred or transmitted or communicated at any time. For example, the calibration code may be transferred in the first image's line or frame, and/or the calibration code may be transferred in the last image's line or frame, and/or the calibration code may be transferred in the first and last images' lines or frames. Optionally, the calibration code overlay may be placed or located in a corner of an image (or elsewhere in the image).

Optionally, the code may be transferred instead of an image picked up by the camera. For example, the code may be transferred instead of an image for a specific time or the code may be transferred instead of an image at a specific time. Optionally, the calibration code image may comprise a color code, such as a color value or color tone or color pattern or the like.

Optionally, the calibration code may be transferred within the 'vertical blanking interval' (pause time between two frames) or separated in parts within several blanking intervals, which may be consecutive, repeated by a certain number of intervals or with gaps in between. Typical systems may be able to transfer about 6 bytes during one vertical blanking interval and about 900 bytes may be transferred when replacing one image frame by one data frame.

Figure 15:
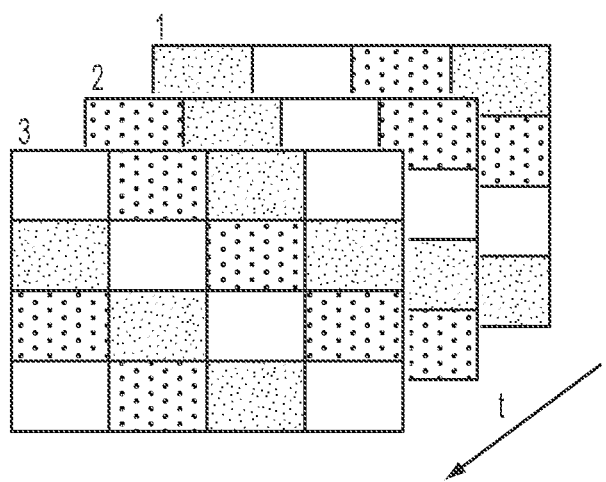
FIG. 15 is an example of a calibration set which may be transferred through an image channel, coded by a color pattern divided up into three consecutive captured images or frames so the code images are different to each other, shown as black and white instead of colors for clarity.

Optionally, the calibration code may be transferred as or within the first image or frame captured or transmitted by the camera, such as when the camera is initially powered up. The code may be transferred from the first image for a specific time or may be transferred as or within one image at a specific time. Optionally, the calibration code may be transferred as or within several images. Optionally, the same pattern or code may be transferred as or within several consecutive images or frames (such as shown in FIG. 15), such as transferred as or within several consecutive images at a specific time or transferred as or within several consecutive images at several specific times of a time pattern.

Figure 16:
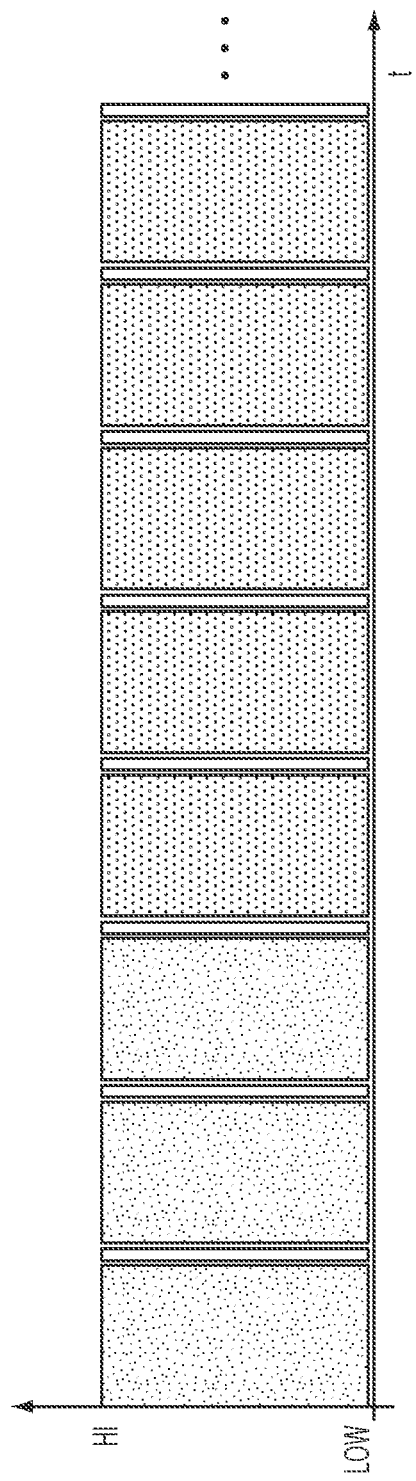
FIG. 16 is an example of a time scheme transferring camera data within the first three frames, such as, for example, during initialization, shown with dark gray: camera data; light gray: image data; and white: no data.

Optionally, and with reference to FIG. 16, a time scheme transfers camera data within the first three frames, such as, for example, during initialization. As shown in FIG. 16, the dark gray portions represent camera data, the light gray portions represent image data and the white portions represent no data. Optionally, and with reference to FIG. 17, a time scheme transferring camera data during a vertical blanking interval is shown, with the time of the blanking interval being relatively small compared to the time it takes to transfer an image frame. As shown in FIG. 17, the dark gray portions represent camera data, the light gray portions represent image data and the white portions represent no data. Optionally, and with reference to FIG. 18, an enlarged timeframe of the vertical blanking time interval of FIG. 17 is shown, with 16 data bit being transferred within one interval. As shown in FIG. 18, the dark gray portions represent camera data, the light gray portions represent image data, the very dark gray portions represent high pulse (positive bits) within the vertical blanking interval and the white portions represent no data.

Optionally, the same calibration code may be transferred as or within several images (such as non-consecutive images) at a specific time pattern. Optionally, the code may be divided up into several consecutive images so the code images are different to each other. Optionally, the coded consecutive images are embedded to a flick.

The code may be transferred via any suitable protocol or signal. For example, the code may be transferred as a non NTFS signal, such as a non NTFS signal that is out of the NTFS bandwidth, or such as a non NTFS superpositioned to the NTFS signal. Optionally, the code may be transferred instead of the NTFS signal. Optionally, the code may be transferred as a side band of the NTFS signal.

Optionally, the camera may be set to its calibration mode responsive to triggering event, such as an input or detection of a code or pattern placed in the field of view of the camera via processing of image data captured by the camera. For example, the camera may be set to its calibration mode (and not exclusively set into the calibration mode) by being shown an optical code. Such an optical code may comprise any suitable pattern or code, such as a specific pattern, such as a bar code or a two dimensional (2D) matrix code or a color code or a color value or color tone or the image's mean value color value or color. The code may be transferred within several images. Optionally, the camera may be set to its calibration mode (and not exclusively set into the calibration mode) by a signal or on/off switch pattern at its power line.

Therefore, the present invention provides a vision system for a vehicle that includes a processor or head unit and a camera or cameras mounted at the vehicle. The processor or head unit is operable to receive calibration data or codes from the camera that are automatically transmitted by the camera when the camera is activated or when the camera is otherwise triggered to send or transmit the calibration data (such as responsive to an input or responsive to detection of a particular pattern or the like in the field of view of the camera). The vision system thus is operable to identify the camera or cameras and associated calibration codes such that the vision system may be automatically calibrated for operation, without any manual inputs or reading of physical labels or the like at the camera.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. provisional applications, Ser. No. 61/563,965, filed Nov. 28, 2011; and/or Ser. No. 61/565,713, filed Dec. 1, 2011, which are hereby incorporated herein by reference in their entireties.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, an array of a plurality of photosensor elements arranged in 640 columns and 480 rows (a 640×480 imaging array), with a respective lens focusing images onto respective portions of the array. The photosensor array may comprise a plurality of photosensor elements arranged in a photosensor array having rows and columns. The logic and control circuit of the imaging sensor may function in any known manner, such as in the manner described in U.S. Pat. Nos. 5,550,677; 5,877,897; 6,498,620; 5,670,935; 5,796,094 and/or 6,396,397, and/or U.S. provisional applications, Ser. No. 61/696,416, filed Sep. 4, 2012; Ser. No. 61/682,995, filed Aug. 14, 2012; Ser. No. 61/682,486, filed Aug. 13, 2012; Ser. No. 61/680,883, filed Aug. 8, 2012; Ser. No. 61/678,375, filed Aug. 1, 2012; Ser. No. 61/676,405, filed Jul. 27, 2012; Ser. No. 61/666,146, filed Jun. 29, 2012; Ser. No. 61/653,665, filed May 31, 2012; Ser. No. 61/653,664, filed May 31, 2012; Ser. No. 61/648,744, filed May 18, 2012; Ser. No. 61/624,507, filed Apr. 16, 2012; Ser. No. 61/616,126, filed Mar. 27, 2012; Ser. No. 61/615,410, filed Mar. 26, 2012; Ser. No. 61/613,651, filed Mar. 21, 2012; Ser. No. 61/607,229, filed Mar. 6, 2012; Ser. No. 61/605,409, filed Mar. 1, 2012; Ser. No. 61/602,878, filed Feb. 24, 2012; Ser. No. 61/602,876, filed Feb. 24, 2012; Ser. No. 61/600,205, filed Feb. 17, 2012; Ser. No. 61/588,833, filed Jan. 20, 2012; Ser. No. 61/583,381, filed Jan. 5, 2012; Ser. No. 61/579,682, filed Dec. 23, 2011; Ser. No. 61/570,017, filed Dec. 13, 2011; Ser. No. 61/568,791, filed Dec. 9, 2011; Ser. No. 61/567,446, filed Dec. 6, 2011; Ser. No. 61/559,970, filed Nov. 15, 2011; and/or Ser. No. 61/552,167, filed Oct. 27, 2011, and/or PCT Application No. PCT/CA2012/000378, filed Apr. 25, 2012, and published Nov. 1, 2012 as International Publication No. WO 2012/145822, and/or PCT Application No. PCT/US2012/048800, filed Jul. 30, 2012, and published Feb. 7, 2013 as International Publication No. WO 2013/019707, and/or PCT Application No. PCT/US2012/048110, filed Jul. 25, 2012, and published Jan. 31, 2013 as International Publication No. WO 2013/016409, and/or U.S. patent application Ser. No. 13/534,657, filed Jun. 27, 2012, and published Jan. 3, 2013 as U.S. Publication No. US-2013-0002873, which are all hereby incorporated herein by reference in their entireties. The system may communicate with other communication systems via any suitable means, such as by utilizing aspects of the systems described in PCT Application No. PCT/US10/038477, filed Jun. 14, 2010, and/or U.S. patent application Ser. No. 13/202,005, filed Aug. 17, 2011, now U.S. Pat. No. 9,126,525, and/or U.S. provisional applications, Ser. No. 61/650,667, filed May 23, 2012; Ser. No. 61/579,682, filed Dec. 23, 2011; Ser. No. 61/565,713, filed Dec. 1, 2011, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454 and 6,824,281, and/or International Publication No. WO 2010/099416, published Sep. 2, 2010, and/or PCT Application No. PCT/US10/47256, filed Aug. 31, 2010, and/or U.S. patent application Ser. No. 12/508,840, filed Jul. 24, 2009, and published Jan. 28, 2010 as U.S. Pat. Publication No. US 2010-0020170; and/or PCT Application No. PCT/US2012/048110, filed Jul. 25, 2012, and published Jan. 31, 2013 as International Publication No. WO 2013/016409, and/or U.S. patent application Ser. No. 13/534,657, filed Jun. 27, 2012, and published Jan. 3, 2013 as U.S. Publication No. US-2013-0002873, which are all hereby incorporated herein by reference in their entireties. The camera or cameras may comprise any suitable cameras or imaging sensors or camera modules, and may utilize aspects of the cameras or sensors described in U.S. patent applications, Ser. No. 12/091,359, filed Apr. 24, 2008 and published Oct. 1, 2009 as U.S. Publication No. US-2009-0244361; and/or Ser. No. 13/260,400, filed Sep. 26, 2011, now U.S. Pat. No. 8,542,451, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606 and/or 7,720,580, and/or U.S. patent application Ser. No. 10/534,632, filed May 11, 2005, now U.S. Pat. No. 7,965,336; and/or PCT Application No. PCT/US2008/076022, filed Sep. 11, 2008 and published Mar. 19, 2009 as International Publication No. WO/2009/036176, and/or PCT Application No. PCT/US2008/078700, filed Oct. 3, 2008 and published Apr. 9, 2009 as International Publication No. WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,720,580; 7,038,577; 5,929,786 and/or 5,786,772, and/or U.S. patent applications, Ser. No. 11/239,980, filed Sep. 30, 2005, now U.S. Pat. No. 7,881,496, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149; and/or U.S. patent applications, Ser. No. 11/226,628, filed Sep. 14, 2005 and published Mar. 23, 2006 as U.S. Publication No. US-2006-0061008, and/or Ser. No. 12/578,732, filed Oct. 14, 2009, now U.S. Pat. No. 9,487,144, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, now U.S. Pat. No. 9,264,672, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in PCT Application No. PCT/US2011/056295, filed Oct. 14, 2011 and published Apr. 19, 2012 as International Publication No. WO 2012/051500, which is hereby incorporated herein by reference in its entirety). Optionally, the vision system may provide a display of a top-down view or birds-eye view of the vehicle or a surround view at the vehicle, such as by utilizing aspects of the vision systems described in PCT Application No. PCT/US10/25545, filed Feb. 26, 2010 and published on Sep. 2, 2010 as International Publication No. WO 2010/099416, and/or PCT Application No. PCT/US10/47256, filed Aug. 31, 2010 and published Mar. 10, 2011 as International Publication No. WO 2011/028686, and/or U.S. patent application Ser. No. 13/333,337, filed Dec. 21, 2011, now U.S. Pat. No. 9,264,672, and/or PCT Application No. PCT/CA2012/000378, filed Apr. 25, 2012, and published Nov. 1, 2012 as International Publication No. WO 2012/145822, and/or U.S. provisional application Ser. No. 61/559,970, filed Nov. 15, 2011, which are hereby incorporated herein by reference in their entireties.

Optionally, the video mirror display may be disposed rearward of and behind the reflective element assembly and may comprise a display such as the types disclosed in U.S. Pat. Nos. 5,530,240; 6,329,925; 7,626,749; 7,581,859; 7,338,177; 7,274,501; 7,255,451; 7,195,381; 7,184,190; 5,668,663; 5,724,187 and/or 6,690,268, and/or in U.S. patent applications, Ser. No. 12/091,525, filed Apr. 25, 2008, now U.S. Pat. No. 7,855,755; Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

The display or displays may comprise a video display and may utilize aspects of the video display devices or modules described in U.S. Pat. Nos. 6,690,268; 7,184,190; 7,274,501; 7,370,983 and/or 7,446,650, and/or U.S. patent applications, Ser. No. 12/091,525, filed Apr. 25, 2008, now U.S. Pat. No. 7,855,755; and/or Ser. No. 10/538,724, filed Jun. 13, 2005 and published Mar. 9, 2006 as U.S. Publication No. US-2006-0050018, which are all hereby incorporated herein by reference in their entireties. The video display may be operable to display images captured by one or more imaging sensors or cameras at the vehicle.

Changes and modifications to the specifically described embodiments may be carried out without departing from the principles of the present invention, which is intended to be limited only by the scope of the appended claims as interpreted according to the principles of patent law.

The invention claimed is:

1. A vehicular vision system, said vehicular vision system comprising:
a plurality of imaging sensors disposed at a vehicle and having respective exterior fields of view, each of said imaging sensors capturing respective image data;
a control disposed at the vehicle, the control comprising a data processor;
wherein said imaging sensors are connected to said control via respective ones of a plurality of single core coaxial cables;
wherein each of said single core coaxial cables commonly carries (i) image data from the respective imaging sensor to the control for processing at the data processor and (ii) power to the respective imaging sensor;
wherein each of said imaging sensors is capable of communicating via an ETHERNET communication protocol;
wherein, when initially powering up said vehicular vision system, each of said imaging sensors is in a respective initial mode;
wherein, while each of said imaging sensors is in the respective initial mode, the ETHERNET communication protocol is transmitted by said control to each of said imaging sensors and each of said imaging sensors receives the ETHERNET communication protocol;
wherein, after the ETHERNET communication protocol is transmitted by said control to each of said imaging sensors, each of said imaging sensors communicates with said control in accordance with the ETHERNET communication protocol; and
wherein each of said single core coaxial cables provides bidirectional communication between said control and the respective imaging sensor.

2. The vehicular vision system of claim 1, wherein, while each of said imaging sensors is in the respective initial mode, each of said imaging sensors communicates, using the ETHERNET communication protocol, with at least one selected from the group consisting of (i) a communication interface of said vehicular vision system and (ii) a display device operable to display images derived from image data captured by at least one of said imaging sensors for viewing by a driver of the vehicle.

3. The vehicular vision system of claim 1, wherein, when initially powering up said vehicular vision system, a transceiver of each of said imaging sensors is tuned to the respective initial mode.

4. The vehicular vision system of claim 1, further comprising a display device disposed in the vehicle and operable to display images derived from image data captured by at least one of said imaging sensors for viewing by a driver of the vehicle.

5. The vehicular vision system of claim 1, wherein each of said single core coaxial cables comprises (i) an inner metallic core, (ii) a dielectric medium, (iii) a foil screen, (iv) an outer metallic conductor and (v) an outer sheath.

6. The vehicular vision system of claim 1, wherein each of said single core coaxial cables interfaces via a first signal node comprising a core of the respective single core coaxial cable and a second signal node comprising a shield of the respective single core coaxial cable.

7. The vehicular vision system of claim 1, wherein each of said single core coaxial cables carries communication data.

8. The vehicular vision system of claim 1, wherein power to said imaging sensors is from a DC power supply.

9. A vehicular vision system, said vehicular vision system comprising:
a plurality of imaging sensors disposed at a vehicle and having respective exterior fields of view, each of said imaging sensors capturing respective image data;
a control disposed at the vehicle, the control comprising a data processor;
wherein said imaging sensors are connected to said control via respective ones of a plurality of single core coaxial cables;
wherein each of said single core coaxial cables commonly carries (i) image data from the respective imaging sensor to the control for processing at the data processor and (ii) power to the respective imaging sensor;
wherein each of said imaging sensors is capable of communicating via a Gigabit Multimedia Serial Link (GMSL) communication protocol;
wherein, when initially powering up said vehicular vision system, each of said imaging sensors is in a respective initial mode;
wherein, while each of said imaging sensors is in the respective initial mode, the GMSL communication protocol is transmitted by said control to each of said imaging sensors and each of said imaging sensors receives the GMSL communication protocol;
wherein, after the GMSL communication protocol is transmitted by said control to each of said imaging sensors, each of said imaging sensors communicates with said control in accordance with the GMSL communication protocol; and wherein each of said single core coaxial cables provides bidirectional communication between said control and the respective imaging sensor.

10. The vehicular vision system of claim 9, wherein, while each of said imaging sensors is in the respective initial mode, each of said imaging sensors communicates, using the GMSL communication protocol, with at least one selected from the group consisting of (i) a communication interface of said vehicular vision system and (ii) a display device operable to display images derived from image data captured by at least one of said imaging sensors for viewing by a driver of the vehicle.

11. The vehicular vision system of claim 9, wherein, when initially powering up said vehicular vision system, a transceiver of each of said imaging sensors is tuned to the respective initial mode.

12. The vehicular vision system of claim 9, further comprising a display device disposed in the vehicle and operable to display images derived from image data captured by at least one of said imaging sensors for viewing by a driver of the vehicle.

13. The vehicular vision system of claim 9, wherein each of said single core coaxial cables comprises (i) an inner metallic core, (ii) a dielectric medium, (iii) a foil screen, (iv) an outer metallic conductor and (v) an outer sheath.

14. The vehicular vision system of claim 9, wherein each of said single core coaxial cables interfaces via a first signal node comprising a core of the respective single core coaxial cable and a second signal node comprising a shield of the respective single core coaxial cable.

15. The vehicular vision system of claim 9, wherein each of said single core coaxial cables carries communication data.

16. The vehicular vision system of claim 9, wherein power to said imaging sensors is from a DC power supply.

17. A vehicular vision system, said vehicular vision system comprising:
  a plurality of imaging sensors disposed at a vehicle and having respective exterior fields of view, each of said imaging sensors capturing respective image data;
  a control disposed at the vehicle, the control comprising a data processor;
  wherein said imaging sensors are connected to said control via respective ones of a plurality of single core coaxial cables;
  wherein each of said single core coaxial cables commonly carries (i) image data from the respective imaging sensor to the control for processing at the data processor and (ii) power to the respective imaging sensor;
  wherein each of said imaging sensors is capable of communicating via a FPD-Link III communication protocol;
  wherein, when initially powering up said vehicular vision system, each of said imaging sensors is in a respective initial mode;
  wherein, while each of said imaging sensors is in the respective initial mode, the FPD-Link III communication protocol is transmitted by said control to each of said imaging sensors and each of said imaging sensors receives the FPD-Link III communication protocol;
  wherein, after the FPD-Link III communication protocol is transmitted by said control to each of said imaging sensors, each of said imaging sensors communicates with said control in accordance with the FPD-Link III communication protocol; and
  wherein each of said single core coaxial cables provides bidirectional communication between said control and the respective imaging sensor.

18. The vehicular vision system of claim 17, wherein, while each of said imaging sensors is in the respective initial mode, each of said imaging sensors communicates, using the FPD-Link III communication protocol, with at least one selected from the group consisting of (i) a communication interface of said vehicular vision system and (ii) a display device operable to display images derived from image data captured by at least one of said imaging sensors for viewing by a driver of the vehicle.

19. The vehicular vision system of claim 17, wherein, when initially powering up said vehicular vision system, a transceiver of each of said imaging sensors is tuned to the respective initial mode.

20. The vehicular vision system of claim 17, further comprising a display device disposed in the vehicle and operable to display images derived from image data captured by at least one of said imaging sensors for viewing by a driver of the vehicle.

21. The vehicular vision system of claim 17, wherein each of said single core coaxial cables comprises (i) an inner metallic core, (ii) a dielectric medium, (iii) a foil screen, (iv) an outer metallic conductor and (v) an outer sheath.

22. The vehicular vision system of claim 17, wherein each of said single core coaxial cables interfaces via a first signal node comprising a core of the respective single core coaxial cable and a second signal node comprising a shield of the respective single core coaxial cable.

23. The vehicular vision system of claim 17, wherein each of said single core coaxial cables carries communication data.

24. The vehicular vision system of claim 17, wherein power to said imaging sensors is from a DC power supply.

* * * * *